United States Patent
Sharma et al.

(10) Patent No.: US 12,038,515 B2
(45) Date of Patent: *Jul. 16, 2024

(54) GNSS SPOOFING DETECTION AND RECOVERY

(71) Applicant: QUALCOMM Incorporated, San Diego, CA (US)

(72) Inventors: Arunandan Sharma, San Diego, CA (US); Volodimir Slobodyanyuk, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,518

(22) Filed: Nov. 30, 2022

(65) Prior Publication Data

US 2023/0296785 A1    Sep. 21, 2023

Related U.S. Application Data

(63) Continuation of application No. 17/222,754, filed on Apr. 5, 2021, now Pat. No. 11,536,850.

(51) Int. Cl.
*G01S 19/21* (2010.01)
*G01S 19/05* (2010.01)
(Continued)

(52) U.S. Cl.
CPC .......... *G01S 19/215* (2013.01); *G01S 19/05* (2013.01); *G01S 19/48* (2013.01); *H04W 4/40* (2018.02); *G01S 19/485* (2020.05)

(58) Field of Classification Search
CPC ........ G01S 19/215; G01S 19/05; G01S 19/48; G01S 19/485; H04W 4/40
See application file for complete search history.

(56) References Cited

U.S. PATENT DOCUMENTS 8,531,332 B2    9/2013  Gum et al.
9,503,968 B2   11/2016  Nathanson et al.
(Continued)

FOREIGN PATENT DOCUMENTS

CN      110320533 A    10/2019
EP       2908454 A2    8/2015
(Continued)

OTHER PUBLICATIONS

International Search Report and Written Opinion—PCT/US2022/070288—ISA/EPO—May 9, 2022.
(Continued)

*Primary Examiner* — Cassi J Galt
(74) *Attorney, Agent, or Firm* — QUALCOMM Incorporated

(57) ABSTRACT

A method includes, by a mobile device, receiving a Global Navigation Satellite System (GNSS) signal, and receiving, from a wireless device, via a PC5 interface, a message including a location of a reference structure. The method also includes determine whether the GNSS signal is a spoofing signal based on a difference between the location of the reference structure and a location of the mobile device determined based on the GNSS signal.

30 Claims, 15 Drawing Sheets

(51) Int. Cl.
*G01S 19/48* (2010.01)
*H04W 4/40* (2018.01)

(56) References Cited

U.S. PATENT DOCUMENTS

| | | |
|---|---|---|
| 10,969,498 B2 | 4/2021 | Tao et al. |
| 11,137,499 B2 | 10/2021 | Meng |
| 11,435,482 B2 * | 9/2022 | Zalewski .............. G01S 19/215 |
| 11,536,850 B2 * | 12/2022 | Sharma .................. H04W 4/40 |
| 2011/0068973 A1 * | 3/2011 | Humphreys .......... G01S 19/215 |
| | | 342/357.29 |
| 2011/0287779 A1 | 11/2011 | Harper |
| 2016/0370470 A1 | 12/2016 | Mabuchi et al. |
| 2018/0045832 A1 | 2/2018 | Ibrahim et al. |
| 2018/0217266 A1 | 8/2018 | Kim et al. |
| 2019/0302272 A1 | 10/2019 | Balog et al. |
| 2021/0005085 A1 | 1/2021 | Cheng et al. |
| 2021/0270614 A1 * | 9/2021 | Mousain ................. H04W 4/40 |
| 2022/0103988 A1 | 3/2022 | Zhang |
| 2022/0121210 A1 | 4/2022 | Herman et al. |
| 2022/0317312 A1 | 10/2022 | Sharma et al. |

FOREIGN PATENT DOCUMENTS

| | | |
|---|---|---|
| EP | 3495848 A1 | 6/2019 |
| EP | 3617735 A1 | 3/2020 |

OTHER PUBLICATIONS

Miao L., et al., "PC5-Based Cellular-V2X Evolution and Deployment", Sensors, Jan. 27, 2021, 21(3):843. https://doi.org/10.3390/s21030843, pp. 1-14.

Miucic R., "Connected Vehicles: Intelligent Transportation Systems". Cham: Springer International Publishing AG, 2018.

* cited by examiner

GNSS SPOOFING DETECTION AND RECOVERY

RELATED APPLICATIONS

This application is a continuation of U.S. patent application Ser. No. 17/222,754, filed Apr. 5, 2021, entitled "GNSS SPOOFING DETECTION AND RECOVERY," which is assigned to the assignee hereof and is herein incorporated by reference in its entirety.

BACKGROUND

Obtaining reliable, accurate locations of mobile devices or mobile systems can be useful for many applications, such as emergency handling, personal navigation, autonomous driving, asset tracking, locating a friend or family member, and the like. Existing positioning methods include methods based on measuring radio signals transmitted from a variety of devices or systems including Satellite Vehicles (SVs) and terrestrial radio sources in a wireless network such as base stations and access points. For example, modern electronic devices frequently include systems that can receive signals from satellite navigation systems, commonly referred to as Global Navigation Satellite Systems (each a "GNSS"), and use the satellite signals to determine the location of the devices and other information, such as speed, heading, altitude, and the like. GNSS receivers may be integrated into consumer electronic devices, such as smartphones or smartwatches, as well as into navigation systems in various types of vehicles, such as cars, trucks, ships, aircraft, and drones. Signals from multiple satellites orbiting the earth may be received and processed by a GNSS receiver to determine the location of the GNSS receiver and, by proxy, the location of the device, vehicle, and the like.

SUMMARY

Various inventive embodiments for identifying and verifying GNSS spoofing signals are described herein, including devices, systems, components, apparatuses, methods, procedures, instructions, code, computer storage medium, and the like.

According to certain embodiments, a method may include, by a mobile device, receiving a Global Navigation Satellite System (GNSS) signal; receiving, from a wireless device, via a PC5 interface, a message including a location of a reference structure, a calculated location of the mobile device, or a combination thereof; and determining whether the GNSS signal is a spoofing signal based on: a spoof indication of the GNSS signal, and whether a difference between a location of the mobile device determined based on the GNSS signal and one of the location of the reference structure, the calculated location of the mobile device, or a location of the mobile device determined based on the location of the reference structure is greater than a threshold value. In some embodiments, the wireless device comprises a roadside unit (RSU). In some embodiments, the message comprises a Cellular Vehicle-to-everything (CV2X) message.

In some embodiments of the method, the spoof indication of the GNSS signal may include: a change of a GNSS time derived from the GNSS signal over a previously determined GNSS time greater than a first threshold value, a change of a location of the mobile device determined based on the GNSS signal over a previously determined location of the mobile device greater than a second threshold value, a difference between the GNSS time and a local time of the mobile device greater than a third threshold value, a difference between the location of the mobile device determined based on the GNSS signal and a location of the mobile device determined based on sensor data of the mobile device other than the GNSS signal greater than a fourth threshold value, a signal strength of the GNSS signal greater than a fifth threshold value, a difference between the signal strength of the GNSS signal and a signal strength of a previous GNSS signal that is associated with a same satellite as the GNSS signal greater than a sixth threshold value, a difference between a frequency of the GNSS signal and a frequency of the previous GNSS signal greater than a seven threshold value, or a combination thereof.

In some embodiments, the sensor data of the mobile device may include sensor data of at least one of a RAdio Detection And Ranging (RADAR) sensor, a camera, a LIght Detection And Ranging (LIDAR) sensor, a motion sensor, an Inertial Measurement Unit (IMU), a wheel sensor, or an ultrasonic sensor. In some embodiments, the computer-implemented method may include, upon determining that the GNSS signal is a spoofing signal, determining the location of the mobile device based on the sensor data of the mobile device other than the GNSS signal.

In some embodiments, the computer-implemented method may include sending a request to the RSU for reference location information. The request may be included in a CV2X Basic Safety Message (BSM) that may include location information of the mobile device (e.g., location of the mobile device determined based on GNSS signals). The calculated location of the mobile device may be determined by the RSU based on at least one of the location information (e.g., speed and direction) of the mobile device included in the CV2X BSM, a signal strength of the CV2X BSM, or an output of a sensor (e.g., a camera) associated with the RSU.

In some embodiments, the computer-implemented method may include receiving, from the RSU, a confidence level of the calculated location of the mobile device. In some embodiments, the computer-implemented method may include receiving, from the RSU, an indication that a difference between a location of the mobile device determined based on the GNSS signal and the calculated location of the mobile device is greater than a threshold value.

In some embodiments, the CV2X message may include at least one of a road safety message (RSM), a Traveler Information Message (TIM), or a Signal Phase and Time (SPAT) message. The reference structure may include the RSU, a bridge, a landmark, a building, a roadside marker, or the like.

According to certain embodiments, a device may include a transceiver including a PC5 interface, a GNSS receiver, a memory, and one or more processors communicatively coupled with the transceiver, the GNSS receiver, and the memory. The one or more processors may be configured to perform any of the above methods. According to certain embodiments, a device may include means for performing any of the above methods. According to certain embodiments, a non-transitory computer-readable medium may include instructions embedded thereon. The instructions, when executed by one or more processing units, may cause the processing units to perform any of the above methods.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

Figure 1:
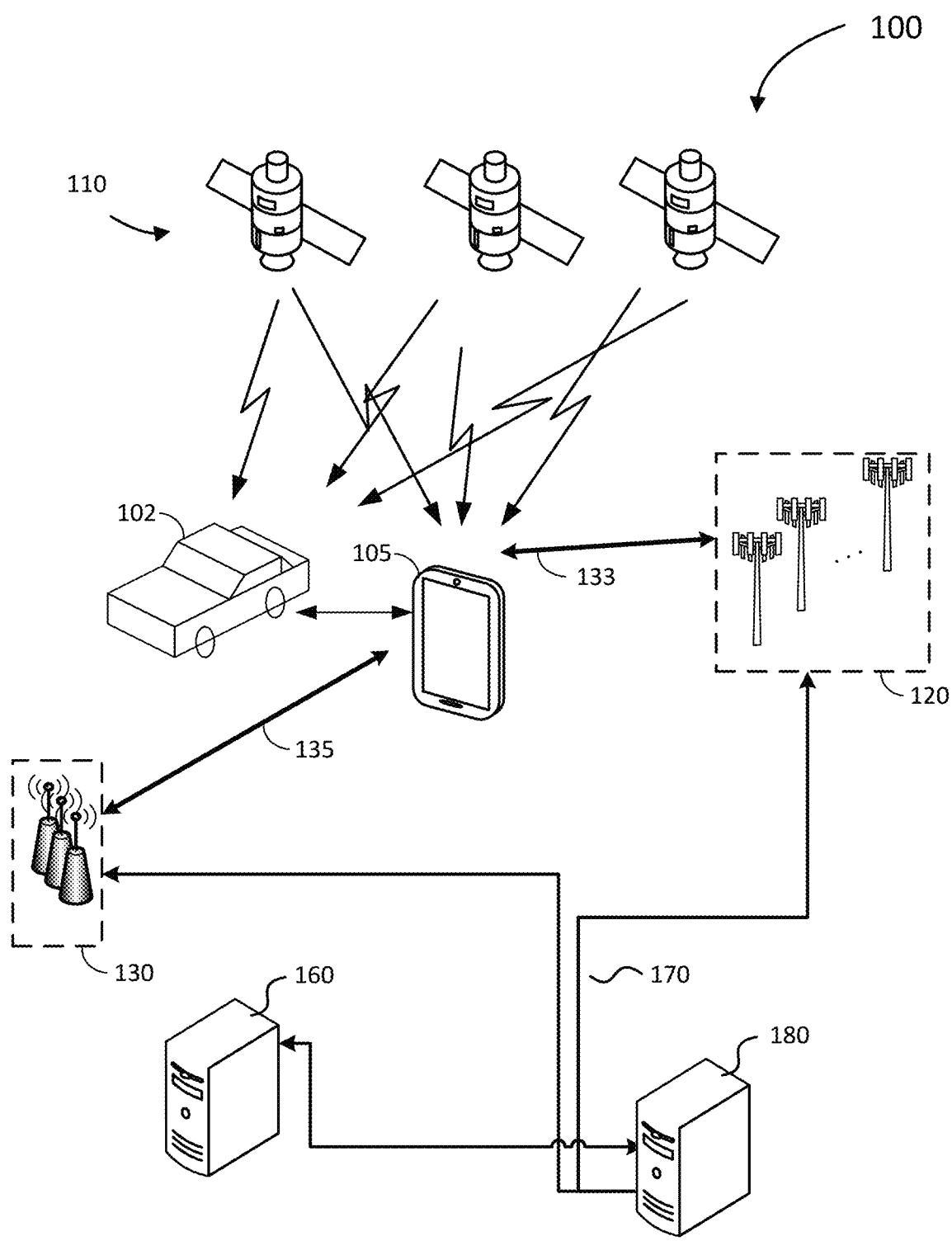
FIG. 1 is a simplified diagram of an example of a positioning system according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein relate generally to detecting and mitigating Global Navigation Satellite System (GNSS) spoofing signals, and more specifically, to detecting, verifying, and mitigating GNSS spoofing signals using roadside units (RSUs) or other wireless devices that include cellular vehicle-to-everything (CV2X) or other PC5 interfaces. Various inventive embodiments are described herein, including devices, systems, components, apparatuses, methods, procedures, instructions, codes, computer-readable storage medium, and the like.

More and more users around the world are relying on mobile navigation services because knowing the location of a moving object, such as a mobile device or vehicles, can be very useful for many applications and/or in many circumstances, such as emergency calls, personal navigation, autonomous driving, asset tracking, locating a person, and the like. For example, a vehicle with Level 4 or higher level automation may depend on its sensor system to accurately determine the location of the vehicle within a lane for specific applications, such as collision avoidance. High-accuracy positioning may be achieved by receiving, integrating, and post-processing inputs from various types of sensors, such as GNSS receivers, Inertial Measurement Units (IMUs), cameras, LIght Detection And Ranging (LI-DAR) systems, and Radio Detection And Ranging (RA-DAR) systems. In these types of sensors, GNSS receivers may provide a direct measurement of the location of a vehicle, while other sensors may provide information from which the location of the vehicle may be indirectly determined with various degrees of accuracy.

Determining an incorrect location of a mobile object can have significant consequences. An incorrect location of the mobile object may be determined based on erroneous or inaccurate input information, such as incorrect or inaccurate Satellite Positioning System (SPS) signals that may be unintentional (e.g., due to satellite or GNSs receiver errors) or intentional (e.g., due to an entity providing one or more spoofing signals). A spoofing signal is a signal that appears to be from a particular source (e.g., a satellite), but is actually from a different source. Despite the advances in GNSS technology, GNSS systems remain vulnerable to adversarial attacks, such as jamming and spoofing. For example, Global Positioning System (GPS) signals include open signals with no encryptions and thus may be vulnerable to spoofing attacks where adversaries can inject falsified GPS signals to control a victim's GPS device. Jamming attacks may be immediately obvious due to the inability of the GNSS receiver to recover satellite signals and the subsequent loss of the location fix, but GNSS spoofing may not be easily detectable.

A spoofing signal may have characteristics of a signal from a GPS space vehicle (SV) but may actually originate from, for example, a GLONASS SV or an SPS simulator (e.g., a terrestrial-based SPS signal generator). A spoofing device or system (referred to herein as a spoofer) may rebroadcast GNSS signals recorded at another place or time (referred to as meaconing) or may generate and transmit modified satellite signals. Since many GNSS receivers are designed to use the strongest GPS signals for positioning, spoofing signals may generally be strong signals that can outpower the weaker but legitimate satellite signals. Identifying spoofing signals or other anomalous signals can help a GNSS receiver mitigate the consequences of receiving such signals and avoid determining a wrong location fix. If GNSS spoofing is undetected by a vehicle, it can have significant negative impact because the actual vehicle location may not match the location determined using the spoofing signals. While GNSS jamming attacks may be handled by Level 4 (and higher) automation systems (at least for a short period of time), proper mitigation of GNSS spoofing attacks is currently not supported by most automotive autonomy software, thus posing a serious security and safety threat.

According to certain embodiments, a mobile device (a vehicle or a smartphone) including a GNSS receiver may identify potential GNSS spoofing signals using various techniques (e.g., time and/or location difference) and verify the potential spoofing signals by communicating with wireless devices (e.g., RSUs) through Cellular Vehicle-to-everything (CV2X) interfaces or other PC5 interfaces. For example, the mobile device may receive RSU location information from an RSU and use the RSU location information to verify potential spoofing signals. In some embodiments, the mobile device may request reference location information from an RSU, the RSU may determine the location of the mobile device and send the determined location of the mobile device and/or the location of the RSU (or other reference or calibration structure) to the mobile device, and the mobile device may then use the location information to verify potential spoofing signals.

When a spoofing attack occurs, the time and/or the geographical location derived from the GNSS spoofing signals may be different from the ones derived from uncompromised GNSS signals. For example, a spoofed GNSS signal may carry a GPS time that is different from the actual GPS time. GNSS spoofing signals may indicate a location different from the location derived from real GNSS signals. Thus, according to some embodiments, GNSS spoofing may be detected by tracking the changes in the position and/or time derived from the mobile device. When spoofing occurs, the difference between the local time (e.g., derived from the local clock of the mobile device) and the GPS time may experience a sudden change, and the calculated location may also change suddenly.

A real abrupt change in location may be corroborated by some sensors. For example, when there is an abrupt change in the location of a vehicle, a IMU on the vehicle may register a rapid acceleration, a RADAR or LIDAR may observe rapid changes of the surrounding environment, a RADAR may detect a sudden rise in the doppler shift, a steering column sensor may register a change in yaw, and wheels sensors may register changes in the vehicle velocity. In the absence of these sensor signals, the abrupt change in the vehicle location calculated using GNSS signals (which may be spoofed) may be identified by a software application as suspicious. Therefore, potential GNSS spoofing signals may be detected when, for example, a difference between the GNSS time and a local time of the device is greater than a threshold value, a difference between a location determined based on the GNSS signals and a location determined based on sensor data other than the GNSS signals is greater than a threshold value, a signal strength of the GNSS signals is greater than a threshold value, a difference between a signal strength of the GNSS signal and a signal strength of a previous GNSS signal that is associated with a same satellite as the GNSS signal is greater than a threshold value, or a difference between a frequency of a GNSS signal and a frequency of a previous GNSS signal that is associated with a same satellite as the GNSS signal is greater than a seven threshold value, but there are no corroborating signals from other sensors. After suspicious performance of the GNSS subsystem is identified, it may be desirable to confirm or disaffirm whether GNSS spoofing has truly occurred by independent means, such that GNSS spoofing detection can be accomplished at a high confidence level.

According to certain embodiments, CV2X infrastructure, 5G infrastructure, or other wireless communication infrastructures may be utilized to verify the presence of the spoofing attack. Current road infrastructure includes many stationary objects with well-defined coordinates, such as bridges, road signs, stop lights, and the like. With the proliferation of CV2X infrastructure, more and more of these infrastructure objects may be equipped with RSUs that are capable of broadcasting specific information, such as road conditions, traffic hazards, and the like. According to certain embodiments, the RSUs may be configured to broadcast additional information, such as the locations (e.g., the Latitude, Longitude, Altitude (LLA) or other acceptable reference coordinates) of the infrastructure objects or other reference objects (e.g., landmarks, buildings, or other structures) using CV2X interfaces. The mobile device may detect these infrastructure objects and/or reference objects, measure the relative location of the mobile device with respect to these infrastructure objects and/or reference objects (e.g., based on signal strength or using a LIDAR, a RADAR, ultrasonic sensors, or cameras), and determine the location of the mobile device in the global system of reference based on the measured relative location and the (received) position information of these infrastructure objects and/or reference objects. If a mismatch between the location derived from GNSS signals and the location determined based on the CV2X information from RSUs is observed, GNSS spoofing may be confirmed.

In one example, a sensor system on a vehicle may use RSU location information to verify the fidelity of the GNSS information. The Sensor system may receive CV2X messages from the RSUs. Examples of the CV2X messages include road safety message (RSM), Traveler Information Message (TIM), Signal Phase and Time (SPAT), and the like. These messages may include location information of RSUs or other reference objects. The sensor system may compare the location information from the RSUs (or a location determined using the location information from the RSUs as described above) with the location determined based on GNSS information, and may identify GNSS spoofing when an unexplainable discrepancy is detected.

In another example, once the sensor system on the vehicle identifies potential GNSS spoofing, it may request reference location information from RSUs. An RSU may provide information regarding the RSU's own location and the calculated vehicle location. The calculated vehicle location may be determined using, for example, signal strength of the CV2X signal, vehicle direction and speed, and other sensor information, such as outputs of one or more cameras. The RSU may compare the GNSS location information received from the vehicle (e.g., in a Basic Safety Message (BSM)) with the calculate location to determine the confidence level of the vehicle reported location. In addition, the RSU may send the location information of any other objects (e.g., landmark, reference or calibration objects, etc.) that can be used by the sensor system of the vehicle to confirm/dismiss the potential GNSS spoofing as described above.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, a router), tablet computer, laptop computer, tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" includes an electromagnetic wave of a given frequency range that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

A "space vehicle" or "SV," as referred to herein, relates to an object that is capable of transmitting signals to receivers on the earth's surface. In one particular example, such a SV may include a geostationary satellite. Alternatively, a SV may include a satellite traveling in an orbit and moving relative to a stationary position on the earth. However, these are merely examples of SVs and claimed subject matter is not limited in these respects.

A "location," as referred to herein, relates to information associated with a whereabouts of an object or thing according to a point of reference. For example, such a location may be represented as geographic coordinates such as latitude, longitude, and altitude (LLA). In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects. A "location" is also referred to herein as a "location estimate", "estimated location", "location", "position", "position estimate", "position fix", "estimated position", "location fix", or "fix".

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified diagram of an example of a positioning system 100 according to certain embodiments. In positioning system 100, a UE 105, a location server 160, and/or other components of positioning system 100 can use techniques provided herein for determining an estimated location of UE 105. An estimated location of UE 105 can be used in a variety of applications, such as to assist direction finding or navigation for a user of UE 105 or to assist another user (e.g., associated with external client 180) to locate UE 105. A location of UE 105 may include an absolute location of UE 105 (e.g., a latitude and longitude and possibly altitude) or a relative location of UE 105, such as a location expressed as distances north or south, east or west and possibly above or below some other known fixed locations or some other locations such as a location for UE 105 at some known previous time. A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., a 95% confidence level).

In this example, FIG. 1 illustrates UE 105 as a smartphone device. However, UEs may be any suitable device that includes GNSS capabilities, or may be a device or machine with such GNSS functionality integrated into it. For example, UE 105 may include personal devices such as a smartphone, smartwatch, tablet, laptop, and the like. UEs may include a larger class of devices as well and may include vehicles with integrated GNSS receivers and positioning systems, such as boats, ships, cars, trucks, aircraft, drones, and the like.

Techniques described herein may be implemented by one or more components of positioning system 100. Positioning system 100 can include a vehicle 102, UE 105, one or more satellites 110 (also referred to as space vehicles (SVs)) for a Global Navigation Satellite System (GNSS) such as the Global Positioning System (GPS), base stations 120, access points (APs) 130, a location server 160, a network 170, and an external client 180. UE 105 can be connected to vehicle 102 or within vehicle 102. In general, positioning system 100 can estimate location of UE 105 based on RF signals received by and/or sent from UE 105 and known locations of other components (e.g., satellites 110, base stations 120, or APs 130) transmitting and/or receiving the RF signals. Additional details regarding particular location estimation techniques are discussed in more detail below.

FIG. 1 provides a generalized illustration of various components, any or all of which may be utilized as appropriate, and each of which may be duplicated as needed. Specifically, although only one UE 105 is illustrated, it will be understood that many UEs (e.g., hundreds, thousands, millions, etc.) may utilize positioning system 100. Similarly, positioning system 100 may include a larger or smaller number of base stations 120 and/or APs 130 than illustrated in FIG. 1. The illustrated connections that connect the various components in positioning system 100 include data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, external client 180 may be directly connected to location server 160. A person of ordinary skill in the art will recognize many modifications to the components illustrated.

Depending on the desired functionality, network 170 may include any of a variety of wireless and/or wireline networks. Network 170 can include, for example, any combination of public and/or private networks, local and/or wide-area networks, and the like. Furthermore, network 170 may utilize one or more wired and/or wireless communication technologies. In some embodiments, network 170 may include, for example, a cellular or other mobile network, a wireless local area network (WLAN), a wireless wide-area network (WWAN), and/or the Internet. Examples of network 170 include an LTE wireless network, 5G NR wireless network, a Wi-Fi WLAN, and the Internet. LTE, 5G and NR are wireless technologies defined, or being defined, by the 3rd Generation Partnership Project (3GPP). As used herein, the terms "5G NR," "5G," and "NR" are used interchangeably to refer to these wireless technologies. Network 170 may also include more than one network and/or more than one type of network.

Base stations 120 and access points (APs) 130 are communicatively coupled to network 170. In some embodiments, base station 120s may be owned, maintained, and/or operated by a cellular network provider, and may employ any of a variety of wireless technologies, as described herein below. Depending on the technology of network 170, base station 120 may include a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may include, for example, a Wi-Fi AP or a Bluetooth® AP. Thus, UE 105 can send and receive information with network-connected devices, such as location server 160, by accessing network 170 via base station 120 using a first communication link 133. Additionally or alternatively, because APs 130 may also be communicatively coupled with network 170, UE 105 may communicate with Internet-connected devices, including location server 160, using a second communication link 135.

Location server 160 may include a server and/or another computing device configured to determine an estimated location of UE 105 and/or provide data (e.g., "assistance data") to UE 105 to facilitate the location determination. According to some embodiments, location server 160 may include a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may include a Discovered SLP (D-SLP) or an Emergency SLP (E-SLP). Location server 160 may alternatively include an Enhanced Serving Mobile Location Center (E-SMLC) that supports location of UE 105 using a control plane (CP) location solution for LTE radio access by UE 105. Location server 160 may further include a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In the UP location solution, signaling to control and manage the location of UE 105 may be exchanged between location server 160 and UE 105 as data (e.g., data transported using the Internet Protocol (IP) and/or Transmission Control Protocol (TCP)) from the perspective of network 170.

As described above (and discussed in more detail below), the estimated location of UE 105 may be based on measurements of RF signals sent from and/or received by the UE 105. In particular, these measurements can provide information regarding the relative distance and/or angle of UE 105 from one or more components in positioning system 100 (e.g., satellites 110, APs 130, and base stations 120). The location of UE 105 can be estimated geometrically (e.g., using multi-angulation and/or multi-lateration techniques) based on the distance and/or angle measurements, along with the known position of the one or more components.

Although terrestrial components such as APs 130 and base stations 120 may be fixed, embodiments are not so limited. In some embodiments, mobile components may be used. Moreover, in some embodiments, the location of UE 105 may be estimated at least in part based on measurements of RF signals communicated between UE 105 and one or more other UEs (not shown in FIG. 1), which may be mobile or stationary. Direct communication between UEs in this manner may include sidelink and/or similar Device-to-Device (D2D) communication technologies. Sidelink, which is defined by 3GPP, is a form of D2D communication under the cellular-based LTE and NR standards.

External client 180 may be a web server or remote application that may have some association with UE 105 (e.g., may be accessed by a user of UE 105), or may be a server, application, or computer system providing a location service to some other users, which may include obtaining and providing the location of UE 105 (e.g., to enable a service such as friend or relative finder, asset tracking or child or pet location). Additionally or alternatively, external client 180 may obtain and provide the location of UE 105 to an emergency service provider, government agency, and the like.

A Global Navigation Satellite System ("GNSS") as referred to herein relates to an SPS comprising SVs transmitting synchronized navigation signals according to a common signaling format. Such a GNSS may include, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS constellation. A GNSS receiver (e.g., in UE 105 or vehicle 102) may be used to determine both the absolute location and the relative location of UE 105. The GNSS receiver may include, for example, a receiver that can receive broadcast signals from GNSS satellites, such as satellites for the Global Position System (GPS, United States), Galileo (European Union), Glonass (Russia), Compass, Quasi-Zenith Satellite System (QZSS) over Japan, Indian Regional Navigational Satellite System (IRNSS) over India, Beidou over China, or the like. The GNSS receiver may determine the absolute position and velocity of UE 105 by processing the signals broadcast by satellites. Because the satellites are always in motion, the GNSS receiver may continuously acquire and track the signals from the satellites in view, and compute its distance to a set of satellites based on the speed of the electromagnetic wave (e.g., speed of light) and the propagation time (e.g., time-of-flight) of the incoming signals travelling through space that may be determined using the satellite clock and the receiver local clock.

Figure 2:
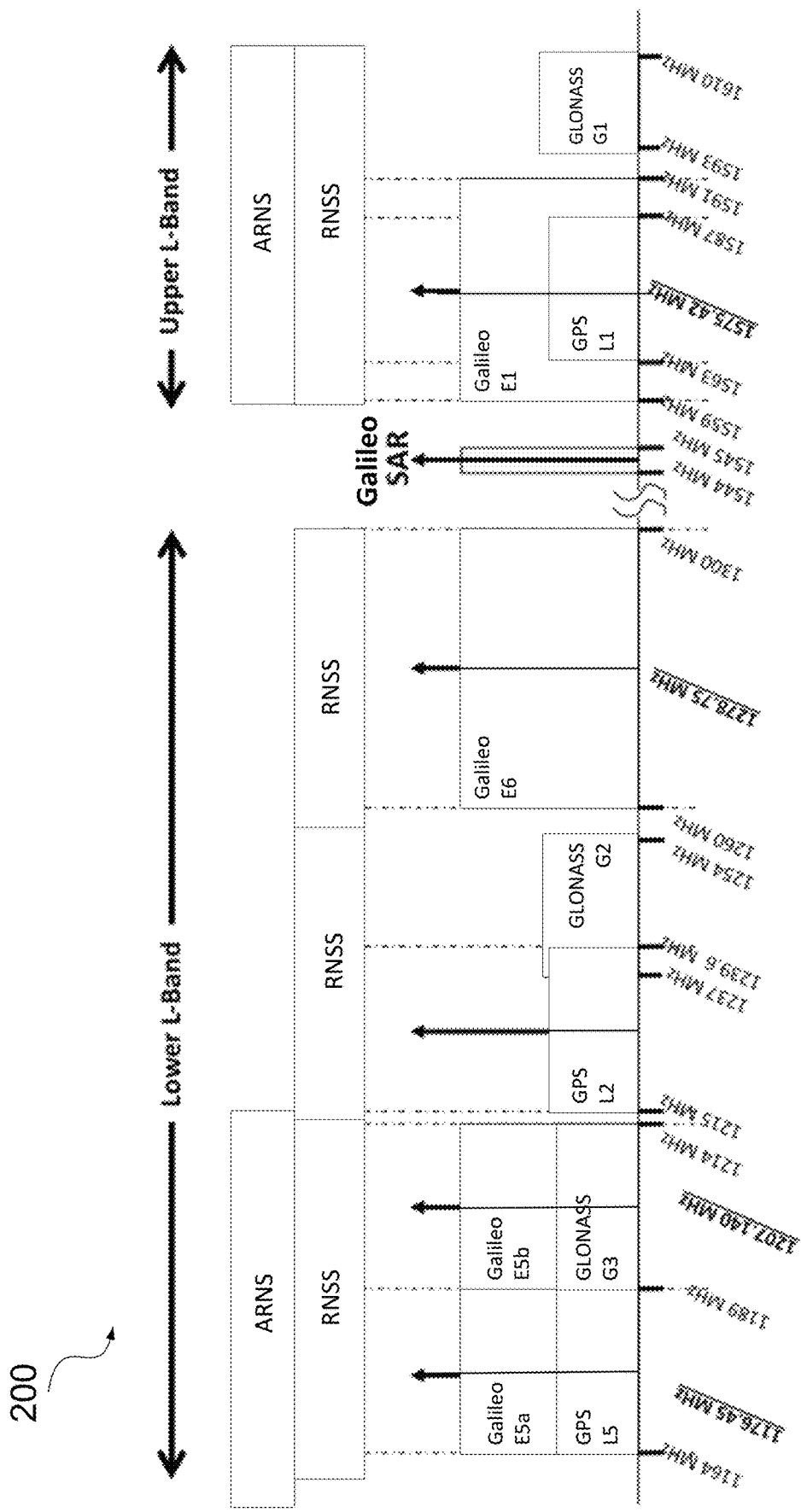
FIG. 2 illustrates frequency bands of examples of Global Navigation Satellite Systems.

FIG. 2 illustrates frequency bands of examples of Global Navigation Satellite Systems. FIG. 2 shows the frequency bands for the Radio Navigation Satellite System (RNSS). There are two bands in the spectrum allocated primarily for Aeronautical Radio Navigation Service (ARNS). These two bands may be suitable for Safety-of-Life applications because no other users are allowed to interfere in these bands. These bands include the upper L-band and the bottom of the lower L-band. The upper L-band includes GPS L1, Galileo E1, and GLONASS G1 signals. The bottom of the lower L-band includes GPS L5 and Galileo E5 signals, with E5a and L5 signals coexisting in the same frequencies. The remaining GPS L2, GLONASS G2, and Galileo E6 signals are in the bands between about 1,215.6 and about 1,350 MHz. These bands are primarily allocated to Radio-location Services (e.g., ground RADARs) and RNSS, and thus GNSS signals in these bands may be more vulnerable to interference. Table 1 below shows the frequency bands of some examples of GNSS systems.

TABLE 1

Frequency bands of examples of Global Navigation Satellite Systems

| GNSS | Lower L-band | Upper L-band |
|---|---|---|
| GPS | L5: 1164-1189 MHz<br>L2: 1215-1239.6 MHz | L1: 1567-1587 MHz |
| Galileo | E5: 1164-1215 MHz<br>E6: 1260-1300 MHZ | E1: 1559-1591 MHz |
| GLONASS | G3: 1189-1214 MHz<br>G2: 1237-1254 MHZ | G1: 1593-1610 MHz |
| BeiDou | B2I: 1179-1203 MHZ<br>B3: 1256-1280 MHz | B1I: 1553-1569 MHz |

Referring back to FIG. 1, the GNSS receiver may receive GNSS signals broadcast by three or more satellites 110. Satellites 110 may orbit at, for example, altitudes around 20,000 km to about 23,000 km, and may have very accurate known time and ephemerides. Satellites 110 may broadcast GNSS signals that include pseudorandom codes. The GNSS signals may have carrier frequencies in the L-band, such as 1575.42 MHz (L1), 1227.6 MHz (L2), or 1176.45 MHz (L5), modulated at about 1 MHz and/or about 10 MHz. For example, the L1 GPS signals may include a navigation message, a coarse acquisition (C/A) code that is not encrypted and is freely available for general civilian access, and an encrypted precision code (P(Y) code) that is used exclusively by authorized U.S. military receivers. The navigation message may be a low bit-rate (e.g., about 50 bps) message that includes, for example, GPS date and time, satellite status and health, satellite ephemeris data (which allows the receiver to calculate the satellite's position), and almanac that includes information and status (e.g., coarse orbit and status information) for all GPS satellites such that GPS receivers know which satellites are available for acquisition and tracking. GNSS signals may pass through the near-vacuum space and various layers of atmosphere to the earth and may be received by the GNSS receivers. In some embodiments, satellite assistance information may be downloaded from a server for determining, in conjunction with received signals, the GNSS receiver's location relative to the satellites and, based on the known location of each satellite, the GNSS receiver's (and thus UE 105's) location on earth.

The GNSS receiver may generally track three or more (e.g., four or more) satellites that are in lines of sight of the antenna of the GNSS receiver and have a small dilution of precision (DOP) to receive GNSS signals from the satellites. For each satellite tracked, the GNSS receiver may determine the propagation time of a pseudorandom noise (PRN) code that includes, for example, 1023 or more bits. A GNSS receiver using code-based techniques may correlate or align with the PRN codes broadcast by satellites to determine its time and position. The GNSS receiver may know the PRN code for each satellite, and thus can determine the time it receives the code from a particular satellite to determine the time of propagation. The time of propagation may be multiplied with the speed of light in free space to calculate the distance between the GNSS receiver and the particular satellite, which may be referred to as a "pseudorange" because the calculated distance may include errors (e.g., clock errors of the GNSS receiver and other errors) and thus may not be exactly equal to the actual range. Using a positioning technique (e.g., the trilateration technique), the satellite ephemeris data, and the calculated distance between the GNSS receiver and each of three of more satellites, a GNSS receiver may determine the location of the GNSS receiver as the intersection point of three or more spheres. Because the relatively large clock error of the GNSS receiver, the three or more spheres may not intersect at a single point. The GNSS receiver may adjust its own clock to determine the time of flight and the pseudoranges, until the three or more spheres approximately intersect at a single point, which indicates the measured location of the GNSS receiver.

As described above, GNSS satellites transmit signals in multiple frequency bands. A GNSS receiver may tune to two or more bands at the same time to improve the accuracy of the position retrieved, such as by cancelling out the non-constant ionosphere delay that depends on the signal's frequency. The electromagnetic waves transmitted by the satellites reach the antenna of a GNSS receiver after traveling more than about 20,000 km. Signals transmitted by GNSS SVs generally have very low signal strength (e.g., less than about −120 dBm) by the time they arrive at the GNSS receiver. The electromagnetic waves may be converted into an electrical signal and de-modulated to determine raw data, such as the pseudorange, phase, carrier-to-noise ratio (C/N0), and Doppler shift. The phase is a precise (but ambiguous) measurement of the electromagnetic wave. C/N0 relates to the received power. Doppler shift is a measurement of the relative motion between a receiver and a satellite. These information may be provided to a navigation engine, which may solve a set of equations to retrieve information about the latitude, longitude, height, and time of the GNSS receiver.

Figure 3:
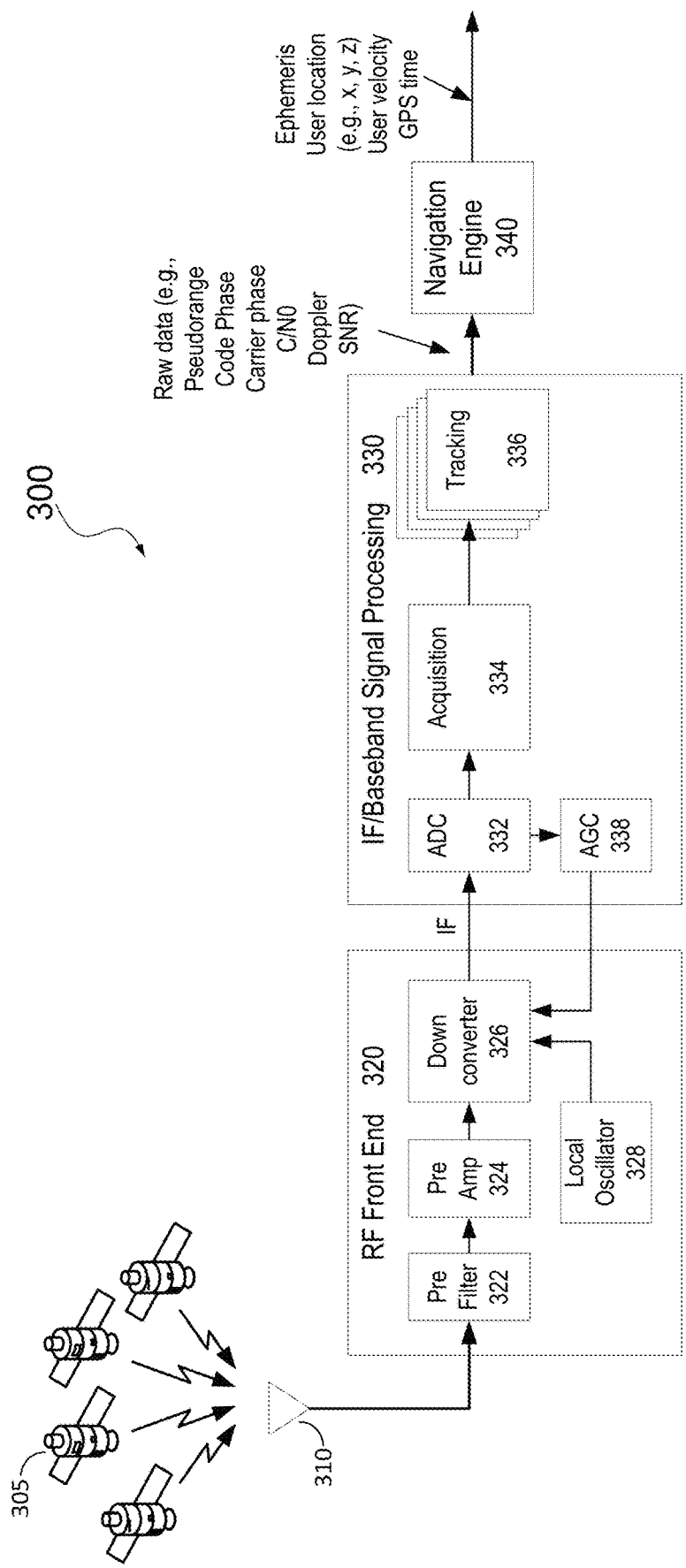
FIG. 3 is a simplified block diagram of an example of a Global Navigation Satellite System (GNSS) receiver.

FIG. 3 is a simplified block diagram of an example of a GNSS receiver 300. GNSS receiver 300 may be a spread spectrum receiver for acquiring, tracking, and extracting useful information from incoming satellite signals. GNSS receiver 300 may include an antenna 310, a radio frequency (RF) front end 320, an intermediate frequency (IF)/baseband (BB) signal processing section 330, and a navigation engine 340. RF front end 320 and IF/BB signal processing section 330 may each include various hardware, software, and firmware modules, whereas navigation engine 340 may generally be implemented using software.

Antenna 310 may be configured to receive right-hand circularly polarized (RHCP) signals transmitted by GNSS satellites. Antenna 310 may need to be able to receive GNSS signals in different frequency bands, polarizations, and elevation angles. An antenna gain pattern of antenna 310 may indicate how well antenna 310 performs at various center frequencies, polarizations, and elevation angles.

In the illustrated example, RF front end 320 may include an optional pre-filter 322, a preamplifier 324, a downconverter 326, and a local oscillator 328. Pre-filter 322 may filter the received signal from antenna 310 to remove signals outside of the L bands, reduce the impact of aliasing, and limit the noise bandwidth. Wide bandwidth signals can provide high-resolution measurements in the time domain but may need higher sampling rates, causing the receiver to consume much more power. A filter can mitigate this by allowing narrower band signals to pass through. In some embodiments, pre-filter 322 may be a part of preamplifier 324.

Because antenna 310 may receive signals in multiple frequency bands, there may be one preamplifier for each band or a broadband preamplifier for multiple bands. Preamplifier 324 may generally include a pre-selector filter (e.g., pre-filter 322) that removes out-of-band interference and limits the noise bandwidth. Preamplifier 324 may also include a low-noise amplifier (LNA) and a burnout protection circuit that prevents possible high-power interference. GPS satellites have an orbit altitude about 20,000 km (90 degrees elevation) from earth. The transmit power of each satellite may be about 45 Watt at about 1575 MHz, and the antenna gain of the satellite may be, for example, about 12 dB. If antenna 310 has an antenna gain about 4 dB, the received signal power may be less than about −120 dBm (about −125 dBm with additional losses, such as atmospheric and antenna losses), while the noise power in the system bandwidth (e.g., about 2.0 MHz) may be about −110 dBm. Due to the direct spread-spectrum modulation scheme, there may be a processing gain of about 43 dB, and thus theoretically a GNSS signal may be recovered as long as it is greater than about −153 dBm. However, in order to improve the quality of services, the received power strength may need to be higher than the theoretical level. For instance, during acquisition, the received signal power may need to be approximately −135 dBm or higher. During tracking, the received signal power may need to be about −147 dBm or higher. An LNA generally needs to amplify the signals by about 20 to about 35 dB to increase them to levels suitable for processing.

Downconverter 326 may convert the RF frequency signals to either intermediate frequency signals or directly to baseband signals to facilitate the sampling and processing. The down conversion is generally done using a mixer. The mixer may multiply the received signal with a carrier signal locally generated by local oscillator 328, and then filter the output signals to remove high order signals and keep the differential (e.g., heterodyne) signal. The filtering and down-conversion may be achieved in multiple, consecutive stages. GNSS receivers make their measurements by estimating the time of arrival, carrier phase, and frequency of the received signal. In some embodiments, a single local reference oscillator may be used to synthesize all reference signals used in the receiver, for example, using a combination of integer and fractional frequency multiplications. In some cases, a GNSS receiver may have multiple frequency references for down-conversion.

IF/BB signal processing section 330 may include, for example, an analog-to-digital converter 332, an acquisition module 334, and one or more tracking units 336. ADC 332 may digitize IF or baseband analog signals to digital signals in the baseband. In some embodiments, an automatic gain control (AGC) stage 338 may be used to adjust the gain of RF front end 320.

During a signal acquisition process, a GNSS receiver may identify satellites that are visible to the receiver, and measure the Doppler shift in the carrier frequency and the delay in the C/A code of the incoming GNSS signal. The acquisition may be performed on a block of data received from the satellite signal, such as the block of data received during a period of C/A code (e.g., 1 ms). Acquisition module 334 may synchronize the locally generated carrier and C/A code with the received signals. Acquisition module 334 may estimate the Doppler frequency and code-delay of the signal from each satellite. In one example, a GNSS signal from the RF front end may be multiplied with a locally generated reference signal. The resultant carrier-free signal (e.g., baseband signal) is multiplied with a locally generated PRN code that has a certain delay. The result is then integrated for a certain time period depending on the type of signal and the signal-to-noise ratio. The integrated result may be compared with a threshold to determine whether the satellite signal has been found. If the integrated result is greater than the threshold, the frequency of the locally generated reference signal and/or the code delay may be passed on to tracking units 336 for further processing. If the integrated result is lower than the threshold, the frequency of the locally generated reference signal and/or the delay of the locally generated PRN code may be adjusted to continue to search for (acquire) the proper satellite, until they match the frequency and code delay of the received signal, thereby producing an integrated result greater than the threshold.

The Doppler shift in the carrier frequency of the GNSS signal may be caused by the relative velocity of the satellite with respect to the receiver. Satellites in the GNSS system move in rapid orbits around the earth, where the orbits may be different for different constellations (e.g., low earth orbit, medium earth orbit, etc.). Thus, while a satellite may transmit at a starting frequency $f_0$, there is a Doppler shift associated with the satellite signal received at the GNSS receiver. This shift is largely due to the motion of the satellite ($\Delta f_{sat}$) and may also be caused by the movement of the receiver ($\Delta f_{receiver}$) Thus, the GNSS receiver may detect the satellite signal at $f_0 + \Delta f_{sat} + \Delta f_{receiver}$. The C/A code delay is due to the transit time of the satellite signal from the satellite to the GNSS receiver. Within a given satellite band, for example, L1 for GPS, each satellite generally transmits at the same frequency but uses orthogonal coding such that different satellite signals may be detected and respective pseudoranges may be determined at the baseband. In contrast, GLONASS satellites share the same coding but use different sub-bands for the satellite signals.

As described above, each satellite in GPS system may transmit a PRN code that includes, for example, 1023 or more bits. The PRN code may be unique to each satellite. For each satellite tracked, the GNSS receiver may determine the propagation time of the PRN code. The GNSS receiver may know the PRN code for each satellite at a given time, and may generate an electronic replica with the GNSS receiver's own clock. The GNSS receiver may then compare the replica signal with the received GNSS signal. Since the GNSS signal was actually created in the satellite some time earlier (e.g., about 0.07 seconds earlier) due to the finite speed of the electromagnetic wave, the receiver's replica signal needs be delayed in order to match or align the incoming signal with the replica signal. This time delay includes the time for the signal to propagate from the satellite to the receiver, and errors in the satellite clock and the receiver clock.

In some embodiments, the time delay can be determined by autocorrelation. In the autocorrelation, the first bit from the incoming signal is multiplied by the first bit of the replica signal. For example, if the first bits from the two signals both have values −1, then the result is (−1) x (−1)=+1. Similarly, if both bits have values +1, then the result is +1. On the other hand, if the two bits disagree, the result is (+1) x (−1)=−1. This process is repeated for the second pair of bits, and so on. The result can be written as a sequence of +1 (where the bits agree) and −1 (where the bits disagree). This sequence is then summed, and divided by the total number of bits in each signal. For example, if signal A includes (+1, −1, −1, +1, −1), and signal B includes (+1, +1, −1, −1, +1), then the multiplication gives (+1, −1, +1, −1, −1), the sum of which gives −1, and dividing the sum by the number of bits (5) gives −0.2. If the two signals matched perfectly, the result would be +1. When the two signals include pseudorandom patterns and are not properly matched in time, the result of the autocorrelation may be close to zero. If the two signals are aligned in time, the result is close to +1 (but not exactly, since a real signal also has noise, and thus some bits may be incorrect). In general, the larger the number of bits that are compared, the better the resolution. The autocorrelation function may have a shape of an equilateral triangle with a value of 1 at its peak (if no noise), which may be used to find the time displacement that maximizes the autocorrelation.

To lock onto a GNSS signal, a GNSS receiver may perform a two dimensional search for the GNSS signal, for example, using the autocorrelation technique described above. The first dimension is the signal frequency. The receiver may determine the carrier frequency including the Doppler shift. Once the carrier frequency with the Doppler shift is evaluated, it is tracked with, for example, a Phase Lock Loop (PLL). The second dimension is time. As described above, the GPS signal for each satellite may include a 1023-bit long PRN code sent at a rate of about 1.023 Mbits per second, such that the code repeats every millisecond. To acquire a GNSS signal in the time dimension, the receiver may set an internal clock to align with one of 1023 possible time slots by searching in the possible time slots. Once the correct delay is found, it is tracked with, for example, a Delay Lock Loop (DLL).

After identifying the available satellites and acquiring the parameters, such as the frequency and code delay of received signal from each of three or more satellites, parallel channels (e.g., tracking units 336) may be used to track the frequencies and delays of the identified satellites using, for example, PLLs and DLLs described above.

The output from IF/BB signal processing section 330 may include raw data, such as the pseudorange to each satellite, code delay and the Doppler frequency of the incoming signal from each satellite, phase delay, and carrier-to-noise ratio (C/NO) or signal-to-noise ratio (SNR). Navigation engine 340 may use the raw data generated by IF/BB signal processing section 330 for three or more satellites to determine the user's position (e.g., x, y, and z coordinates), velocity, and time information.

There may be many errors associated with a GNSS-based position system. For example, the atomic clocks in the GNSS satellites are very accurate, but they may still drift a small amount, and thus may cause an error of, for example, about ±2 meters. Like the satellite clock, the satellite orbit may also vary a small amount, and thus may cause an error of, for example, about ±2.5 meters. To achieve a better accuracy, the GNSS receiver may need to compensate for the clock error and the orbit error of a satellite. For example, some GNSS receivers may use carrier-based techniques that measure the phase of the carrier wave, such as Real Time Kinematic (RTK) and Precise Point Positioning (PPP) techniques. Because the carrier wave for the GNSS signal is a sine wave with a period of less than one meter (e.g., about 19 cm for L1 carrier signal), a much more precise measurement of the time of flight may be achieved using the carrier-based techniques. In some positioning systems, the GNSS receiver may download correction data from, for example, a Satellite Based Augmentation System (SBAS) or PPP service satellite, or a differential GNSS or RTK base station, to further improve the accuracy of the positioning.

GNSS signals may only propagate in a straight line in a vacuum or through a perfectly homogeneous medium, and may bend as they pass through the earth's atmosphere. The layer of the earth's atmosphere that influences the transmission of GPS (and other GNSS) signals the most is the ionosphere layer, a layer about 70 to about 1,000 km above the earth's surface and including ionized gas molecules and free electrons generated by, for example, ultraviolet rays from the sun. The ionosphere layer may delay the satellite signals and can cause a significant amount of satellite position error, such as ±5 meters. The ionospheric delay may vary with solar activity, time of year, season, time of day, location, and the like, and thus may be difficult to predict. The ionospheric delay may also be frequency dependent, and thus may be determined and eliminated by, for example, calculating the range using both L1 and L2 signals. The ionospheric conditions may be similar within a local area such that a base station and rover receivers may experience similar ionospheric delay. As such, the ionospheric delay may be compensated for using, for example, differential GNSS or RTK systems.

Another layer of the earth's atmosphere that may influence the transmission of GNSS signals is the troposphere layer, the lowest layer of the Earth's atmosphere. The delay caused by the troposphere layer may be a function of local temperature, pressure, relative humidity, and the like. L1 and L2 signals may be equally delayed by the troposphere, and thus the effect of tropospheric delay may not be eliminated using GNSS signals in multiple frequencies. The troposphere may be modeled to predict and compensate for much of the tropospheric delay. Since the tropospheric conditions are generally similar within a local area, a base station and nearby rover receivers may experience similar tropospheric delay, which may be compensated for in differential GNSS or RTK systems.

Portions of the GNSS signals transmitted by the satellites may be reflected on the way to the GNSS receiver, such as by a building. This phenomenon is referred to as multipath propagation. The reflected signals travel longer distances and thus are delayed from the direct signals, and may interfere with the direct signals if the reflected signals are sufficiently strong. The delayed signals can cause the receiver to calculate an incorrect position. Multipath errors may be difficult to handle because they are generally local errors that may not be similarly experienced by base stations. Techniques have been developed where the receiver may only consider the earliest-arriving (or the strongest) signals and ignore the multipath signals that arrive later. In some cases, expensive high-end GNSS receivers and antennas may be needed to reduce long-delay multipath errors and short-delay multipath errors.

Location of vehicle 102 may also be determined using GNSS signals in a similar way as UE 105. In addition, vehicle 102 and/or UE 105 may include other devices and sensors for positioning. These sensors may include, for example, cameras, ultrasonic sensors, RADAR sensors (e.g., short- and long-range RADARs), one or more LIDAR sensors, a motion sensor or an IMU (e.g., an accelerometer and/or a gyroscope), a wheel sensor (e.g., a steering angle sensor or rotation sensor), and the like. Each of these sensors may generate signals that provide information related to vehicle 102 (or UE 105) and/or the surrounding environment. Each of the sensors may send and/or receive signals (e.g., signals broadcast into the surrounding environment and signals returned from the surrounding environment) that can be processed to determine attributes of features (e.g., objects) in the surrounding environment.

Figure 4:
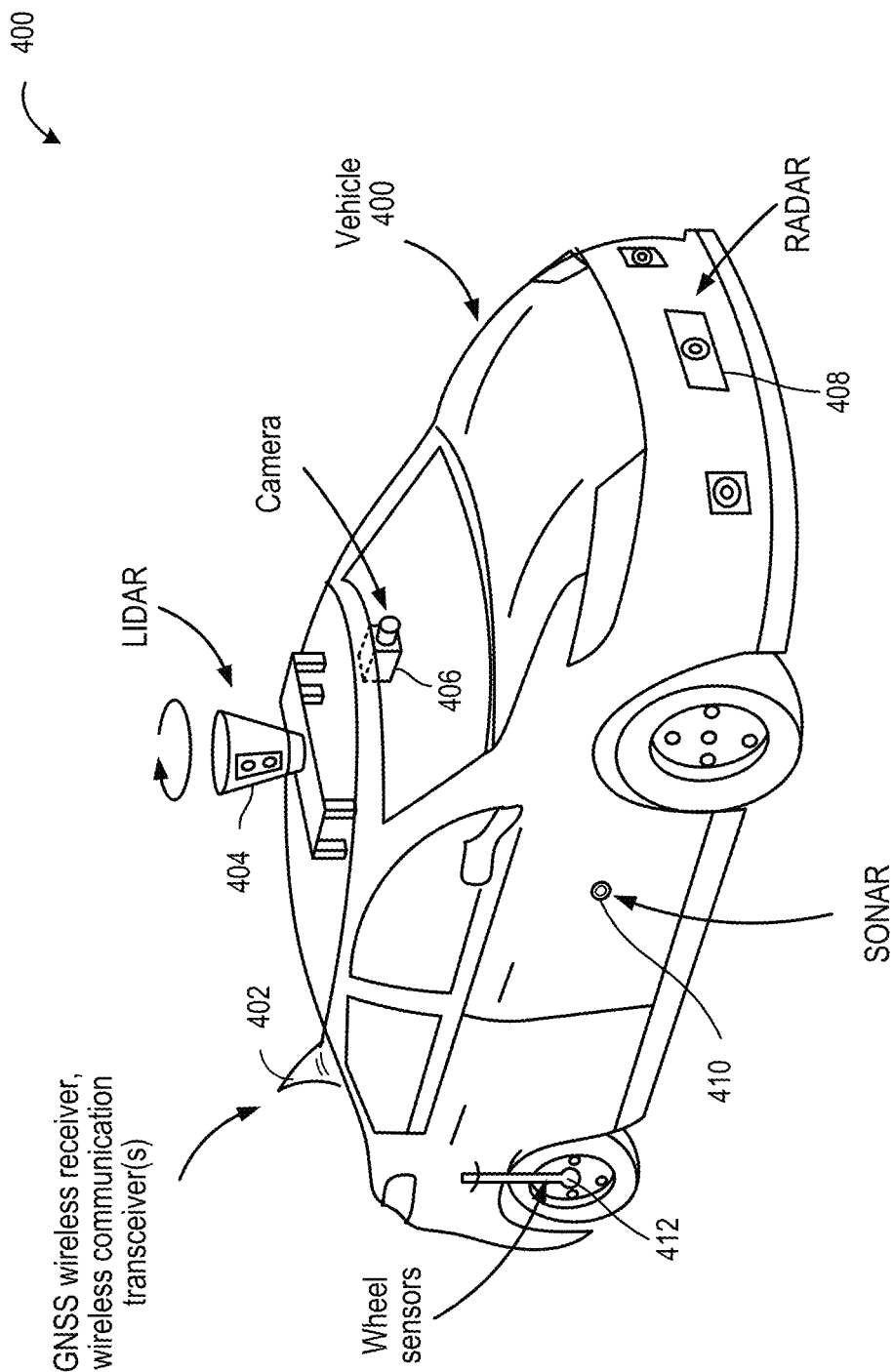
FIG. 4 is a perspective view of an example of a vehicle according to certain embodiments.

FIG. 4 is a perspective view of an example of a vehicle 400 (e.g., an example of vehicle 102) according to certain embodiments. As illustrated, vehicle 400 may include one or more camera(s), such as a rear view mirror-mounted camera 406, a passenger facing camera (not shown), a front fender-mounted camera (not shown), a side mirror-mounted camera (not shown) and a rear camera (not shown, but typically on the trunk, hatch or rear bumper). Vehicle 400 may also include a LIDAR 404 for detecting objects and measuring distances to those objects. LIDAR 404 may be roof-mounted. However, if there are multiple LIDAR units, they may be oriented around the front, rear, and sides of vehicle 400. Vehicle 400 may have other sensors for location determination, such as a GNSS wireless receiver 402 (typically located in the shark fin unit on the rear of the roof, as indicated) and/or various wireless transceivers (such as WAN, WLAN, V2X; typically, but not necessarily, located in the shark fin), a RADAR sensor 408 (typically in the front bumper), and a SONAR 410 (e.g., ultrasonic sensors, typically located on both sides of the vehicle, if present). Wheel sensors 412 may also be present and may include wheel sensors and/or drive train sensors such as tire pressure sensors, accelerometers, gyros, and wheel rotation detection and/or counters. It should be appreciated that any suitable sensor and/or any suitable device/component depicted in FIG. 4 may be installed after market. Thus, any of the sensors/devices/components depicted in FIG. 4 may be an example of a third-party sensor.

The one or more cameras may be used to provide visual information related to vehicle 400 and/or its surroundings, for example, for parking assistance, street sign and/or traffic sign recognition, pedestrian detection, lane markings detection and lane departure warning, surround view, and the like. Two or more cameras may also be used to determine a distance of an environmental feature (e.g., a building or a landmark) based on the positions of the two or more cameras and their view angles of the environmental feature. The cameras may include a wide-angle lens, such as a fisheye lens that can provide a large (e.g., larger than 150°) angle of view. Multiple cameras may provide multiple views that can be stitched together to form an aggregated view. For example, images from cameras located at each side of vehicle 400 can be stitched together to form a 360-degree view of the vehicle and/or its surrounding environment. In certain embodiments, the 360-degree view may be provided from an overhead perspective, such as a perspective looking down on the vehicle at a 45-degree angle.

An array of SONARs 410 (e.g., ultrasonic sensors) may be located on the front bumper of vehicle 400. In some embodiments, vehicle 400 may include ultrasonic sensors on the driver side, the passenger side, and/or the rear bumper of vehicle 400. The ultrasonic sensors may emit ultrasonic waves that can be used by a vehicle control system to detect objects (e.g., people, structures, and/or other vehicles) in the surrounding environment. In some embodiments, the vehicle control system may also use the ultrasonic waves to determine speeds, positions (including distances), and/or other attributes of the objects relative to vehicle 400. The ultrasonic sensors may also be used, for example, for parking assistance.

The RADAR sensors may emit radio frequency waves that can be used by the vehicle control system to detect objects (e.g., people, structures, and/or other vehicles) in the surrounding environment. In some embodiments, the vehicle control system may use the radio frequency waves to determine speeds, positions (including distances), and/or other attributes of the objects. The RADAR sensor may be located at a corner of the front bumper or on the front fascia of the vehicle. Some RADAR sensors may be installed on the rear portions of vehicle 400. The RADAR sensors may include long-range RADARs, medium-range RADARs, and/or short-range RADARs, and may be used, for example, for blind spot detection, rear collision warning, cross traffic alert, adaptive cruise control, and the like.

LIDAR sensors may emit infrared laser light that can be used by the vehicle control system to detect objects (e.g., people, structures, and/or other vehicles) in the surrounding environment, for example, for emergency braking, pedestrian detection, or collision avoidance. In some embodiments, the vehicle control system may use the infrared laser light to determine speeds, positions (including distances), and/or other attributes of the objects. The LIDAR sensor may be located on, for example, a top or bottom portion of vehicle 400.

IMUs may measure the speed, linear acceleration or deceleration, angular acceleration or deceleration, or other parameters related to the motion of vehicle 400. Wheel sensors may include, for example, a steering angle sensor that measures the steering wheel position angle and rate of turn, a rotary speed sensor that measures wheel rotation speed, or another wheel speed sensor.

In some embodiments, vehicle data, such as wheel ticks, forward/reverse signals, steering wheel angles, and other data generated by the sensors described above, may be utilized to improve the accuracy of the GNSS-based position system, such as during GNSS signal outage or weakness or in an environment with spoofing or other anomalous signals. For example, a sensor fusion module of a vehicle may use a dead reckoning technique to fuse IMU data, vehicle data, or other sensor data, and previously determined location of a vehicle (e.g., corrected position data) to estimate position information of the vehicle when the GNSS signal is weak, unavailable, or noisy (due to noise and interference). IMU data may include the velocity and/or acceleration information of the vehicle, and thus may be used to determine the displacement of the vehicle at a particular time instant based on laws and equations of motion.

Dead reckoning is a process of calculating a current position by using a previously determined position (or position fix), and advancing (propagating) that position based upon known or estimated speeds over elapsed time and course. Dead reckoning may be implemented in some high-end navigation systems in order to overcome the limitations of GNSS technology. Satellite signals may be unavailable in, for example, buildings, parking garages, and tunnels, and are often severely degraded in urban canyons and near trees due to blocked lines of sight to the satellites or multipath propagation. In a dead reckoning navigation system, a vehicle may be equipped with, for example, sensors that know the wheel circumference and can record wheel rotations and steering direction. These sensors are often already present in vehicles for other purposes (e.g., anti-lock braking system, electronic stability control, etc.) and can be read by the navigation system from the controller-area network (CAN) bus. The navigation system then uses, for example, a Kalman filter to integrate sensor data with the more accurate but occasionally unavailable position information from the GNSS receiver into a combined position fix. A Kalman filter may perform a recursive two-stage process that includes a prediction stage and an update (or correction) stage. The prediction stage may make estimations of the current state and uncertainties by projecting forward the prior state and uncertainties to obtain an a priori estimation of the current state and uncertainties, and the update stage may make an update to the a priori estimation based on the current measurement to obtain an improved a posteriori estimation.

Some GNSS receivers may store information that can help in speeding up the process of acquiring satellite signals. When a GNSS receiver is turned on, it may retrieve the last computed position, time, almanac, and the like. If this information is accurate enough, the receiver may calculate the approximate Doppler frequencies of all visible satellites such that the receiver may not need to search in the entire frequency plane of the search space or may quickly find the carrier (referred to as a warm start). For example, if a GNSS receiver has time and an approximate location, the location the GNSS satellites may be determined relative to the GNSS receiver. Moreover, because the location, heading, and velocity of each GNSS satellite can be determined based on, for example, the ephemeris and/or the almanac, the doppler offset can be determined for each satellite based on the motion of the satellite. Similarly, the motion of the receiver can be accounted for relative to the satellite in determining the Doppler shift experienced by each satellite signal and thus the time and frequency window to search for a given satellite signal.

In cold start or non-tracking mode, a GNSS receiver may need to search for Doppler frequencies and satellites in a larger time-frequency search space to correlate against the known codes of satellites that are expected to be visible within a range of frequencies determined based on the satellite assistance information and the predicted orbits of the visible satellites. The receiver may then select, for example, the strongest integration peak, based on integration of the signal against the known satellite codes over time.

As described above, in GPS system, each satellite may continuously broadcast GPS information using Coarse/Acquisition (C/A) code (e.g., repeating every 1 ms) in L1 band (e.g., at about 1575.42 MHz). The C/A code is for general civilian access and is not encrypted. In addition, signals transmitted by GNSS SVs generally have very low signal strength (e.g., less than about −120 dBm) by the time they arrive at a GNSS receiver. As a result, radio interference can overpower weak GNSS signals, causing satellite signal loss and potentially loss of positioning. Therefore, civilian GPS may be very vulnerable to spoofing attacks. Malicious actors may take advantages of this vulnerability, and may send incorrect information in a competing signal (referred to as a spoofing signal) that a GNSS receiver may then use to determine navigational data or time data that is different than what would otherwise be determined based on true GNSS signals. This can cause vehicles that rely on GNSS navigation signals to stray off course, or in extreme cases, GNSS spoofing systems can take control of a navigation system and reroute a vehicle to an unintended location, thereby cause accidents or other mischief.

A spoofing signal may have a corresponding purported source, for example, by having a format similar to (e.g., identical to) a format of signals sent by the purported source. For example, a spoofing signal may include the same PRN code associated with the purported satellite. However, the spoofing signal may have some modified parameters, such as time and/or date information, identification, and encoded ephemeris or other encoded information that would lead the GNSS receiver to calculate the wrong location or fail to calculate a location. For example, spoofing signals may simulate signals of a particular SPS constellation at a particular frequency band, such as GPS signals at L1 band, or may comprise simulated signals corresponding to multiple SPS constellations and/or of multiple frequency bands. The more complex the spoofing scenario becomes, the more technically difficult the scenario may be to create/emulate and the more expensive the spoofing scenario becomes to deploy. Spoofing signals may be SPS-based (e.g., from an SV) or may be terrestrial-based (e.g., from fake base stations and/or access points).

GPS spoofing attacks may include two steps. In the first (takeover) step, a spoofer may lure the victim GPS receiver to migrate from a legitimate signal to a spoofing signal. In some cases, a spoofer may transmit faked GPS signals at a high power level, causing the victim to lose track of the satellites and lock on to the stronger spoofing signals. In some cases, a spoofer may transmit signals that are synchronized with the authenticate GPS signals and then gradually overpower the authenticate GPS signals to cause the migration. In the later cases, the spoofing signals may not generate abnormal jumps in the received signal strength, frequency, or time, but the spoofer may need to use specialized hardware to track and synchronize with the original signals in real time at the victim's location. In the second step, the spoofer may manipulate the GPS receiver by either shifting the signals' arrival time or modifying the navigation messages.

A GNSS receiver may be most vulnerable to spoofing signals during the time-frequency search for GNSS signal acquisition. Spoofing signals may be emulated, typically in a coordinated manner, and broadcast at a high signal level, such that the emulated signals and associated offsets and other characteristics may cause a receiver to calculate a false location or series of false locations. The spoofing signals can be coordinated by managing the frequency offset of each of the satellites to be consistent with a fake location or series of fake locations.

The goal of a spoofing system is to appear as consistent as possible with the real GNSS signals and to impart a doppler frequency offset and/or a timing delay offset consistent with a different location rather than the actual location of the GNSS receiver. A spoofing system can include a GNSS receiver to obtain information of visible satellites. The messaging in the spoofing signal may need to be reasonably consistent with that from actual satellites. The spoofing signals may also need to include Doppler offsets that are consistent with a single location that is different from the actual location. The spoofing system may need to be in proximity to the GNSS receiver such that the signal strength of the spoofing signal can be significantly greater than the actual GNSS signals (e.g., ambient outdoors GNSS signal level). In one example, the spoofing system may receive existing GNSS signals, alter the frequency of each satellite signal to be consistent with a Doppler offset for a spoofed location, and rebroadcast the altered signal at a stronger signal strength, based upon the known satellite location (via the downloaded or demodulated assistance data), speed, and heading of each satellites, and the spoofed location.

Figure 5:
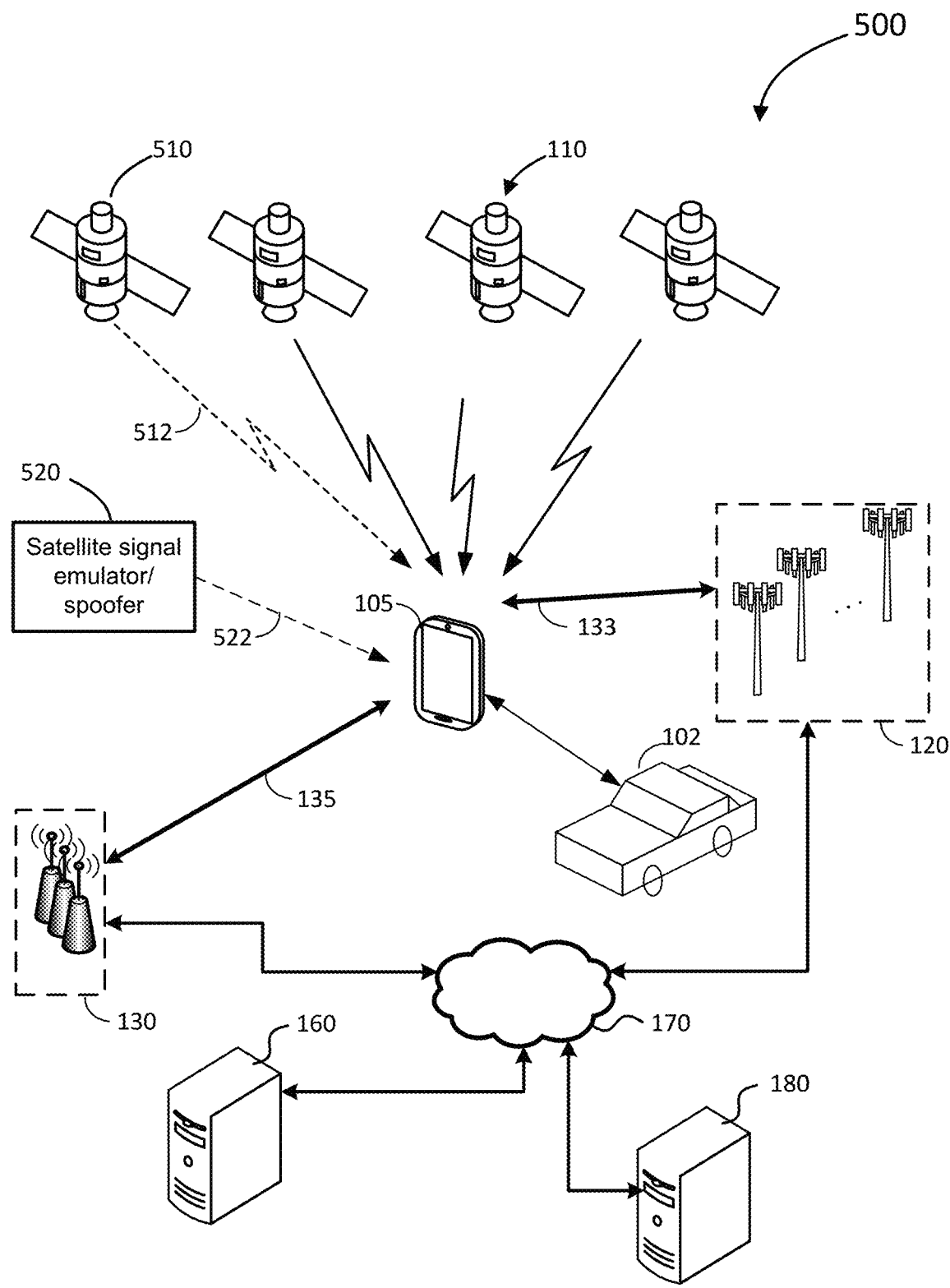
FIG. 5 illustrates examples of anomalous Satellite Positioning System (SPS) signals in an example of a positioning system.

FIG. 5 illustrates examples of anomalous GNSS signals in an example of a positioning system 500. Positioning system 500 may be similar to positioning system 100 and may include, for example, vehicle 102, UE 105, satellites 110, base stations 120, APs 130, location server 160, network 170, and external client 180. Positioning system 500 may also include an SV 510 and a satellite signal emulator 520 that may transmit anomalous GNSS signals. For example, SV 510 may send an anomalous GNSS signal 512 to UE 105. Anomalous GNSS signal 512 has a carrier frequency, where the carrier frequency may be a frequency used by UEs to determine location using GNSS signals, such as an L1 frequency (1575.42 MHz) of a GPS system. Anomalous GNSS signal 512 may be anomalous in one or more ways. For example, anomalous GNSS signal 512 may be a spoofing signal, being produced with a format associated with SV 510 but being inaccurate, such as having incorrect timing, which may lead to an inaccurate determination of the range from UE 105 to SV 510. As another example, anomalous GNSS signal 512 may be a spoofing signal, having a format associated with another SV, such as another SV of the same constellation (e.g., GPS) that contains SV 510 or another SV of a different constellation (e.g., GLONASS rather than GPS). In this case, a pseudorange determined for anomalous GNSS signal 512 may correspond to the range from UE 105 to SV 510 but UE 105 may use this range as a range from UE 105 to the expected location (e.g., as indicated by ephemeris data) of another SV. In any of these scenarios, inaccurate information in a signal having a format of SV 510 or a signal simulating a format of another SV may be received by UE 105, and UE 105 may calculate an incorrect location for UE 105, if UE 105 does not recognize anomalous GNSS signal 512 as being anomalous and thus would not take appropriate actions, such as not using anomalous GNSS signal 512 and/or a pseudorange determined from anomalous GNSS signal 512 to determine the location of UE 105.

In another example, UE 105 may receive anomalous GNSS signals 522 from a satellite signal emulator 520 (e.g., a spoofer). Satellite signal emulator 520 may be a GNSS signal simulator configured to produce and send signals that mimic GNSS signals. Anomalous GNSS signals 522 may thus emulate signals from (e.g., having formats (e.g., pseudorandom codes) corresponding to) SVs such as satellites 110. Anomalous GNSS signals 522 may have much higher power than non-anomalous GNSS signals from satellites 110 when received by UE 105, which may cause UE 105 to lock to anomalous GNSS signals 522 over (instead of) the non-anomalous GNSS signals actually sent by satellites 110 as described above.

Figure 6:
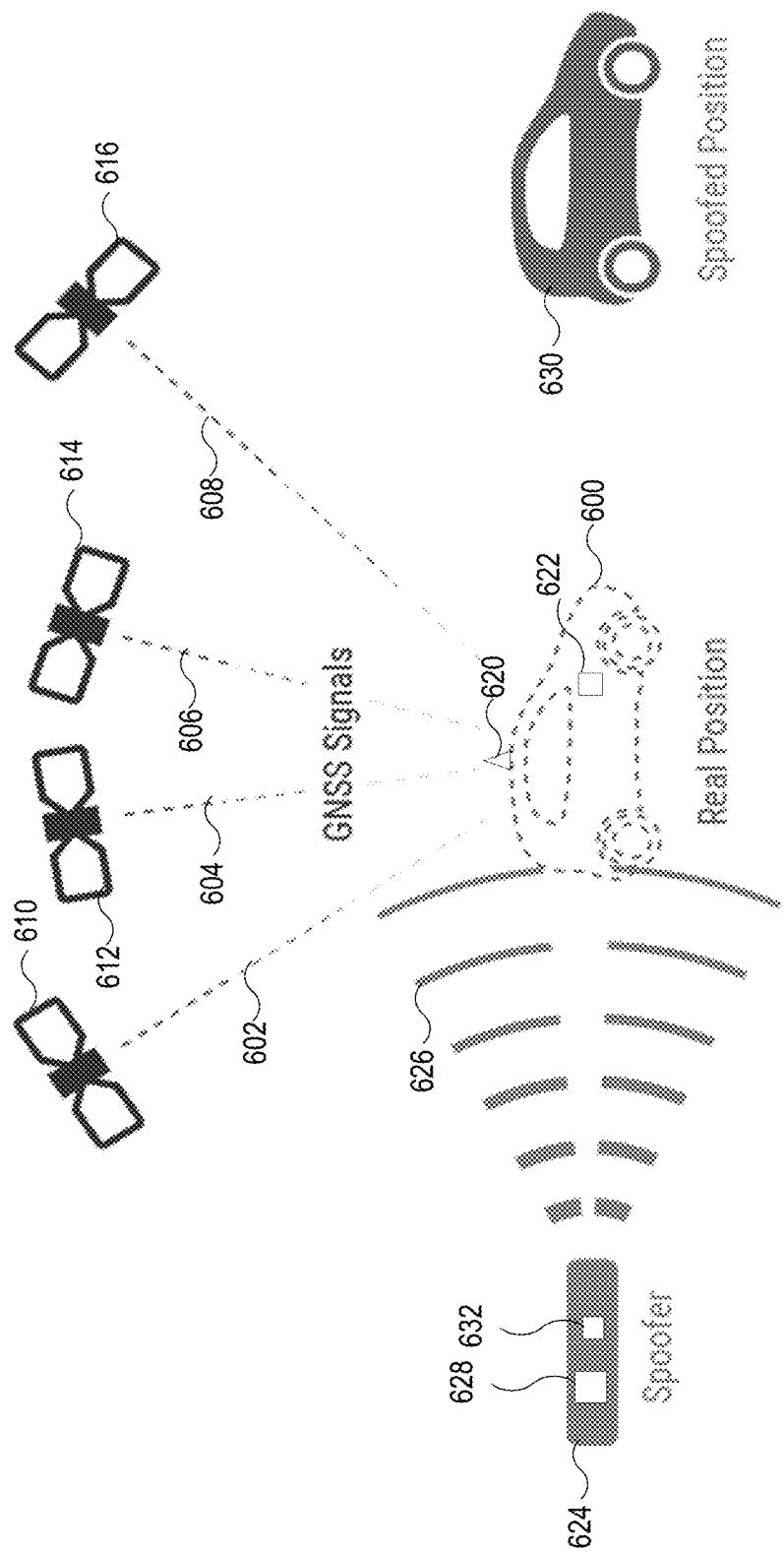
FIG. 6 illustrates an example of spoofing by a ground-based spoofer.

FIG. 6 illustrates an example of spoofing by a ground-based spoofer 624 that may be mobile or stationary. Spoofer 624 may be an example of satellite signal emulator 520. Spoofer 624 may include an antenna 628 and a transmitter 632. Spoofer 624 can generate a spoofing signal 626 that is received by a vehicle antenna 620 of a vehicle 600. Spoofing signal 626 can be a composite signal which contains a plurality of false GNSS satellite signals. Spoofing signal 626 can be generated so as to mimic real GNSS satellite signals. In some embodiments, spoofer 624 may be located at a fixed geographic location. In some embodiments, spoofer 624 may be mobile (e.g., attached to a vehicle or vessel).

Spoofer 624 can be designed to create false GNSS satellite signals in several ways. In some embodiments, spoofer 624 may create spoofing signal 626 by simulating real GNSS satellite signals programmed with the desired false satellite data. For example, antenna 628 of spoofer 624 may capture real GNSS signals 602, 604, 606, and 608 from satellite 610, 612, 614, and 616, respectively, and then modify (e.g., shift in time and/or frequency) and rebroadcast these signals with transmitter 632. Spoofer 624 may create spoofing signal 626 by re-broadcasting live GNSS signals that include false GNSS data (e.g., for a spoofed position 630) meant to be accepted by a GNSS receiver at a different location as real GNSS signals to derive the spoofed position. Spoofing signal 626 can be a composite of a plurality of GNSS signals and can contain any number of false GNSS satellite signals. Spoofer 624 may simulate stationary or moving locations as well. For example, a spoofer 624 may simulate locations that form a circle around a geographic area.

The power level of spoofing signal 626 can be set such that, when spoofing signal 626 is received by vehicle antenna 620, spoofing signal 626 overpowers real GNSS signals 602, 604, 606, and 608. Consequently, receiver 622 may use spoofing signal 626 to compute a spoofed GNSS location based on false GNSS satellite signal. Specifically, receiver 622 may measure the GNSS satellite signal phase (code phase and/or carrier phase) values of spoofing signal 626, use the code phase and/or the carrier phase values to compute GNSS location coordinates for a spoofed location different from the true location, and report that the vehicle is at the spoofed location instead of its true location. Spoofing of a navigation system can also make a navigation device provide false timing data.

According to certain embodiments, a mobile device including a GNSS receiver may identify potential GNSS spoofing signals using various techniques (e.g., time and/or location difference and signal consistency) and verify the potential spoofing signals by communicating with RSUs or other wireless device through Cellular Vehicle-to-everything (CV2X) interfaces or other PC5 interfaces. For example, the mobile device may receive RSU location information (or location information of another reference structure) from an RSU and use the RSU location information (or the location information of another reference structure) to verify potential spoofing signals. In some embodiments, the mobile device may request reference location information from an RSU, the RSU may determine the location of the mobile device and send the determined location of the mobile device and/or the location of the RSU (or another reference structure) to the mobile device, and the mobile device may then use the location information to verify potential spoofing signals.

Figure 7:
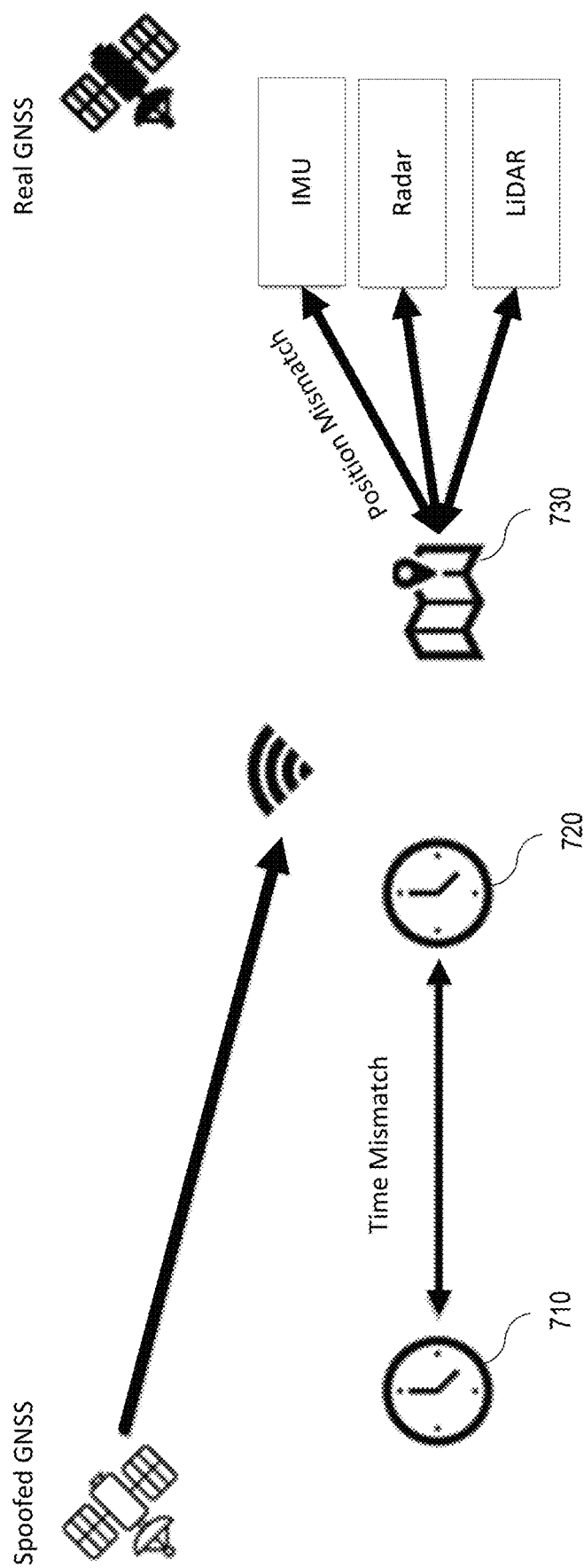
FIG. 7 illustrates examples of methods of GNSS spoofing detection according to certain embodiments.

FIG. 7 illustrates examples of methods of GNSS spoofing detection according to certain embodiments. When a spoofing attack occurs, the time and/or the geographical position derived from the spoofed GNSS signal may be different from the ones derived from uncompromised GNSS signals. For example, a spoofed GNSS signal may carry GNSS time that is different from the actual GNSS time. Thus, according to some embodiments, GNSS spoofing may be detected by tracking the changes in the GNSS time derived from the GNSS signals. When spoofing occurs, the difference between the local time 710 (e.g., derived from the local clock of a mobile device) and the GNSS time 720 may experience a sudden change.

Spoofed GNSS signals may also indicate a location different from the location derived from real GNSS signals. When spoofing occurs, the calculated location may change suddenly. An abrupt change in actual location may be corroborated using some sensors. For example, when an abrupt change in actual location occurs, the IMU may register a rapid acceleration to validate the abrupt change in location, a RADAR or LiDAR may observe a rapid change of the surrounding environments, a RADAR may detect a sudden rise in the doppler shift, a steering column sensor may register a change in yaw, and/or wheels sensors may register changes in the vehicle velocity. In the absence of these sensor signals, the abrupt change in the vehicle location 730 calculated using GNSS signals (which may be spoofed) may be identified by a software application as suspicious.

As described above, a GNSS receiver may be in a tracking mode, where the determined GNSS pseudoranges may be fed into a Kalman filter or another location propagation filter that may or may not use inputs from other sensors on a vehicle. The location propagation filter may determine a propagated location, while the GNSS receiver may predict a location based on pseudoranges determined using GNSS signals. If the difference between the propagated location from the location propagation filter and the predicted location from the GNSS receiver is greater than a threshold value, a location jump may occur and the system may have locked onto spoofing signals instead of real GNSS signals. In some embodiments, as described above, other sensors, such as motion sensors, ultrasonic sensors, RADAR sensors, LIDAR sensors, wheel sensors, and the like, may be used to predict a location of a vehicle, as in positioning using dead reckoning techniques (e.g., pedestrian dead reckoning or automotive dead reckoning), and then the predicted location may be compared with the predicted location using GNSS pseudoranges. If the difference is greater than a threshold value, the GNSS signals used to determine the pseudoranges may be spoofing signals. In some embodiments, the location predicted based on GNSS signals may be compared with a location determined based on, for example, Wi-Fi and/or WAN-based trilateration and/or dead reckoning. If the difference is greater than a threshold value, the GNSS signals used to determine the pseudoranges may be spoofing signals. In some embodiments, if the location (and/or the history of the location) predicted based on GNSS signals does not match certain features (e.g., a straight street rather than a circle indicated by the GNSS signals) on a map or the surrounding environment (e.g., near a landmark or on land rather than on water, as determined using a camera), the GNSS signals may include spoofing signals. For example, if the GNSS receiver is on a street but the GNSS signals indicate that the GNSS receiver is in a different environment (e.g., in a boat on water), the GNSS signals may include spoofing signals.

In some embodiments, spoofing signals may be detected by a GNSS receiver based on the signal strength. As described above, at a GNSS receiver, spoofing signals generated by a spoofer (e.g., satellite signal emulator 520 or spoofer 624) generally have signal strength greater than the signal strength of real GNSS signals transmitted by GNSS SVs, in order to lure the GNSS receiver to lock onto the stronger spoofing signals. Thus, a sudden increase in signal strength or a signal strength that is higher than a threshold value would indicate that the detected signal may be a spoofing signal. The threshold may be, for example, a typical GNSS signal strength in open sky condition or another signal environment. When the signal strength is consistently above the threshold, the signal may be a spoofing signal. In some embodiments, the threshold may be determined through crowdsourcing. In some embodiments, an increase in signal (or carrier) to noise ratio may indicate that the received signal is a potential spoofing signal.

In some embodiments, a GNSS receiver may detect spoofing signals by detecting the time discontinuities at the GNSS receiver. The time discontinuities may occur when the spoofing device is not synchronized with the GNSS time or when there is a significant delay in the spoofing signals sent out by a spoofer. As described above, a spoofer may need time to acquire real GNSS signals and generate the spoofing signals, and thus there may be a noticeable delay in generating the spoofing signals at the spoofing device. Thus, as the spoofing signals are acquired and used to determine location and time by a GNSS receiver that has been synchronized with GNSS time (e.g., in a hot mode), the GNSS receiver may detect a time change that may be approximately equal to the time delay associated with the processing time at the spoofing device.

In some embodiments, a GNSS receiver may detect spoofing signals by detecting a sudden change in the signal frequency of a GNSS signal at the GNSS receiver, in particular, when all signals are impacted coherently to indicate a new location. In some embodiments, Doppler shifts and/or phase delays of received GNSS signals may be compared to determine whether a signal with a higher strength may be anomalous (with signals outside the expected time windows and/or Doppler windows being identified as anomalous). Additionally or alternatively, a coarse location of a mobile device (e.g., determined based on WAN and/or Wi-Fi signals or other sensor data as described above) may be used to determine expected Doppler shift and phase shift, and a GNSS signal that is significantly different from the expected Doppler shift and/or phase shift may be identified as a potential spoofing signal.

In some embodiments, a disagreement between GNSS signals received from different constellations, different satellites in a constellation, or different frequency bands may indicate that some of the signals may be spoofing signals. If the signals disagree consistently by more than a threshold amount, such as an amount that cannot be explained by GNSS scatter, some of the signals may be spoofing signals. The threshold amount may be a fixed threshold or may be determined by measuring the GNSS scatter across the received signals.

Once suspicious performance of the GNSS subsystem is identified, it is desirable to confirm or disaffirm whether GNSS spoofing has indeed occurred by independent means, so that positive determination could be accomplished at a high confidence level. According to certain embodiments, CV2X infrastructure and/or 5G infrastructure may be utilized to verify the presence of a spoofing attack.

For example, current road infrastructure includes many stationary objects with well-defined coordinates, such as bridges, road signs, stop lights, and the like. With the proliferation of the CV2X infrastructure, more and more of these infrastructure objects may be equipped with RSUs that are capable of broadcasting specific information, such as road conditions, traffic hazards, and the like. According to certain embodiments, the RSUs may be configured to broadcast additional information, such as the locations (e.g., the Latitude, Longitude, Altitude (LLA) or other acceptable coordinates) of the infrastructure objects or other reference objects (e.g., landmarks, buildings, or other structures) using CV2X interfaces. The mobile device may detect these infrastructure objects and/or reference objects, measure the relative location of the mobile device with respect to these infrastructure objects and/or reference objects, and determine the approximate location of the mobile device in the global system of reference based on the measured relative location and the received position information of these infrastructure objects and/or other reference objects. If the mismatch between the position derived from GNSS signals and the location determined using information in the CV2X messages is observed, GNSS spoofing may be confirmed.

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (e.g., roadside units (RSUs)), vehicle-to-person (V2P) communication between vehicles and nearby people (pedestrians, cyclists, and other road users), and the like. Further, V2X can use any of a variety of wireless radio frequency (RF) communication technologies. For example, Cellular V2X (CV2X) is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or another V2X entity that is used to communicate V2X messages is generically referred to as a V2X device or V2X user equipment (UE).

Autonomous and semi-autonomous vehicles, including vehicles with Advanced Driver-Assistance Systems (ADAS), can communicate and coordinate maneuvers using V2X. To help V2X-capable vehicles ("V2X vehicles") maneuver safely on the road, V2X vehicles can communicate intended maneuvers to other V2X vehicles. This can include maneuvers such as a lane change, intersection crossing, and the like, along with the corresponding time window for the behavior trajectory.

V2X-capable vehicles may execute vehicle-to-vehicle (V2V) safety applications built around Society of Automotive Engineers (SAE) J2735 Basic Safety Messages (BSMs), which communicate information about vehicle position, time, heading, speed, acceleration, predicted path, path history, and more. BSMs may also include information such as vehicle type, description, and identification. Other V2X messages may include, but are not limited to, Traveler Information Message (TIM) (used to convey information regarding different traffic conditions, such as incidents (e.g., traffic accidents) and planned roadwork events (e.g., road construction)), cooperative awareness messages (e.g., used to announce position, movement, and basic attributes of a transmitting device), decentralized environmental notification messages (e.g., utilized to report detection of a traffic event or road hazard), MAP messages (used to provide road topography and geometric data on intersections and roadway lanes), Signal Phase And Timing (SPAT) messages (e.g., information of one or more traffic lights for one or more intersections), in-vehicle information messages (e.g., used for providing static or dynamic road signage information for in-vehicle presentation), and the like. V2X message may also be utilized to support safety applications such as Forward Collision Warnings (FCW), Do-Not-Pass Warnings (DNPW), and the like. In some embodiments, V2X capable vehicles may be configured to transmit vehicle metadata (also referred to as "vehicle data"). In some embodiments, a V2X capable vehicle may further be configured to transmit occupant metadata (also referred to herein as "occupant data").

Not all vehicles are V2X capable or may have differing levels of V2X capabilities. A vehicle that lacks the capability to transmit V2X messages (and/or may not participate at a highest level of participation in a V2X environment) is referred to herein as a legacy vehicle (LV). In some embodiments, a legacy vehicle may be one that lacks the ability to fully participate in V2X communications. For example, a legacy vehicle might be capable of transmitting certain V2X messages but may lack the ability to transmit, receive, and/or process at least some other V2X messages. In such cases, a mobile device may be used as a proxy to receive, transmit, and/or process data on behalf of the legacy vehicle). The mobile device (e.g., a smartphone, smartwatch, laptop, tablet, etc.) may be separate from the vehicle. In some embodiments, the mobile device is a device that is different from any of the devices of the legacy vehicle as manufactured. The mobile device may process V2X messages on behalf of the LV. In some embodiments, the mobile device may be utilized to obtain any suitable combination of vehicle metadata and/or occupant metadata. While receiving V2X messages as the LV's proxy, the mobile device may be configured to determine whether the received V2X messages are relevant to the vehicle. In some embodiments, the relevancy may be based at least in part on vehicle metadata and/or occupant metadata stored at the mobile device.

In some embodiments, one or more V2X messages can include vehicle attributes (e.g., color, make, model, one or more images, license plate identifier, ADAS capabilities, vehicle position, speed, heading, acceleration, location, lane number, and/or the like) of each of the vehicles sensed by a given Remote Vehicle (RV). Some of these attributes may be transmitted by V2X message, received by the given RV (or another V2X capable device), and retransmitted to other devices (e.g., other vehicles and/or proxy devices). Recipients of such data may include devices that are now aware of another vehicle even though the device lacks direct line of sight with that vehicle, has not collected any sensor data corresponding to that vehicle, and/or may be out of reception range to receive the message from its original source (e.g., the vehicle itself). Each V2X capable device (e.g., an RV, a proxy device, etc.) can transmit any suitable combination of its own attributes (in the case of the proxy device, its own attributes refer to the attributes of the vehicle for which it operates as proxy) via one or more V2X messages. This collective data can be used to inform nearby vehicles' movement and maneuver execution.

The V2X capable vehicles and the mobile device operating as proxy (referred to herein as a Proxy Device (PD)) for an LV may receive V2X messages from remote devices (e.g., nearby V2X-capable RVs, RSUs, and other proxy devices). For example, nearby RVs may broadcast BSM messages up to 10 times per second (10 Hz). The V2X capable vehicles or PDs may verify digitally-signed certificates of the messages and determining, based on the content of the messages, whether to provide driver assistance information (e.g., alerts, alarms, graphical and/or audible data, etc.) to a driver, alter or execute a maneuver, store received data elements, etc. Moreover, additional message types (e.g., non-BSM safety messages) may also be communicated to the PD from nearby RVs, and other communications may be received from other remote devices such as roadside units (RSUs), traffic-related servers, and more.

Figure 8:
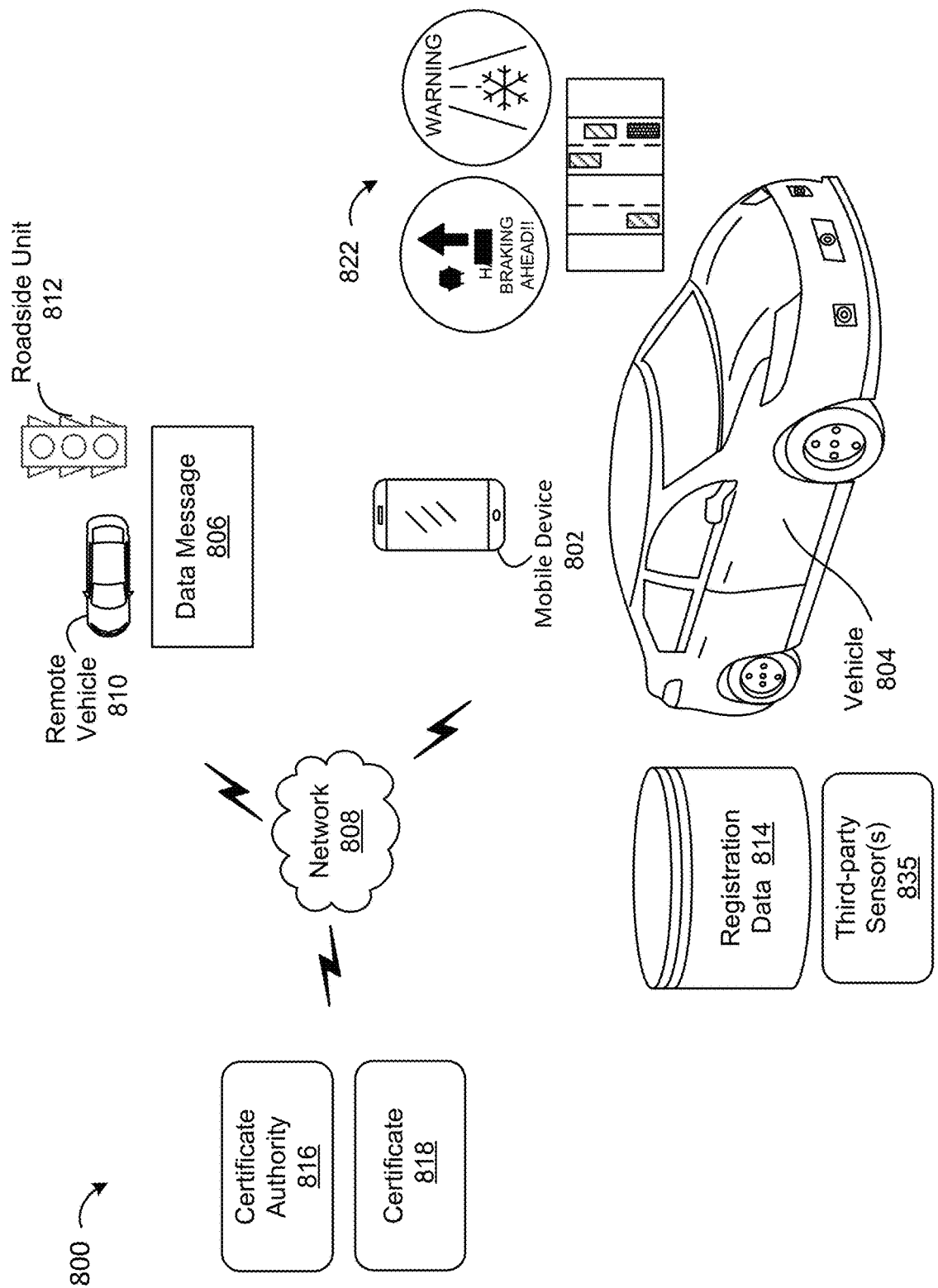
FIG. 8 is a simplified block diagram illustrating an example of a vehicle-to-everything (V2X) environment according to certain embodiments.

FIG. 8 includes a simplified block diagram illustrating an example of an environment 800 (e.g., a V2X environment) according to an embodiment. By way of example, FIG. 8 depicts a mobile device 802 being utilized as a proxy for a vehicle 804, which may or may not be a legacy vehicle that lacks communication capabilities and/or components for environment 800. That is, vehicle 804 may or may not transmit and/or receive V2X data messages (e.g., data message 806, a V2X message) via network 808 (e.g., a cellular network, a Wi-Fi network, any suitable network configured for V2X communications, etc.). Vehicle 804 may include one or more third-party sensors as described above. Data message 806 may be transmitted by any suitable remote device (e.g., an RV 810, a roadside unit 812, or any suitable device different from mobile device 802, the device being utilized to transmit and receive V2X messages for vehicle 804). It should be appreciated that mobile device 802 may be temporally located within vehicle 804 and may be utilized as a proxy device for transmitting and/or receiving V2X messages on behalf of vehicle 804. In other embodiments, vehicle 804 may be a V2X capable vehicle that is configured to transmit and receive V2X messages via network 808. In either scenario, mobile device 802 and vehicle 804 may be communicatively coupled (e.g., via network 808, a Bluetooth pairing, etc.) such that data may be exchanged between mobile device 802 and vehicle 804.

In some embodiments, mobile device 802 and/or vehicle 804 may be utilized to obtain registration data 814. Registration data 814 may, in some embodiments, include any suitable combination of vehicle metadata describing attributes of vehicle 804 and/or occupant metadata describing one or more occupants (e.g., the driver, one or more passengers) of vehicle 804. Registration data 814 may be stored in any suitable combination of the memory of vehicle 804 and/or the memory of mobile device 802.

In some embodiments, environment 800 may include a certificate authority 816. Certificate authority 816 may be any suitable entity (e.g., a state or federal government agency, a network provider of network 808, or the like). In some embodiments, vehicle 804 (if V2X capable) and/or mobile device 802 (when operating as a proxy for vehicle 804) may request and/or receive a certificate (e.g., certificate 818) from certificate authority 816. In some embodiments, the certificate may be stored in memory of vehicle 804 and/or mobile device 802 during manufacturer or at any suitable time. In some embodiments, certificate 818 may include a credential associated with certificate authority 816 (e.g., a public key of a public/private key pair associated with the certificate authority, etc.). In some embodiments, each transmitting device of network 808 may be required to provide a respective credential (e.g., credential 820) with each data message transmitted via network 808. In some embodiments, some portion of the data of each data message may be encrypted and/or digitally signed (e.g., using a private key of the transmitting device). By way of example, credential 820 may include a digital certificate issued by certificate authority 816, the digital certificate comprising a public key of the transmitting device as signed by the private key of the certificate authority. In some embodiments, a receiving device (e.g., mobile device 802 or vehicle 804) may utilize the public key of certificate authority 816 (e.g., obtained from certificate 818) to decrypt some portion of the data message that was encrypted with the private key of the transmitting device and/or to verify the digital signature, the digital signature being generated using the private key of the transmitting device and provided in the data message.

Mobile device 802 operating as proxy for vehicle 804 (or vehicle 804 itself) may be configured to execute any suitable operations based at least in part on processing data message 806. By way of example, the receiving device (e.g., the mobile device operating as proxy for vehicle 804 or vehicle 804 if vehicle 804 is V2X capable) may be configured to generate driver assistance information 822. Driver assistance information 822 may include any suitable combination of graphical presentations and/or audible presentations that inform the driver of any suitable condition (e.g., weather conditions, road conditions, other driver's actions such as hard breaking, a real-time model that depicts at least locations of all V2X devices and sensed vehicles in environment 800 within a threshold distance of vehicle 804 or mobile device 802 if its acting as proxy for vehicle 804). Driver assistance information 822 may be presented via one or more output devices (e.g., a display and/or speaker) of mobile device 802 and/or one or more output devices of vehicle 804.

In some embodiments, additional vehicle metadata or other vehicle attribute (e.g., speed, heading, location, acceleration, etc.) may be provided via data message 806. By way of example, RV 810 or RSU 812 may utilize one or more of its sensors (e.g., a camera or a LIDAR) to determine attributes of vehicle 804. RV 810 or RSU 812 may transmit these vehicle attributes in data message 806. Upon receipt, the receiving device may be configured to store this additional vehicle metadata (e.g., as part of the vehicle metadata of registration data 814, separate from the vehicle metadata of registration data 814). The receiving device may be configured to store this additional vehicle metadata when it may be determined that the received vehicle metadata is relevant to the receiving device (e.g., either describes aspects of the receiving device or the vehicle for which the receiving device operates as proxy).

Figure 9:
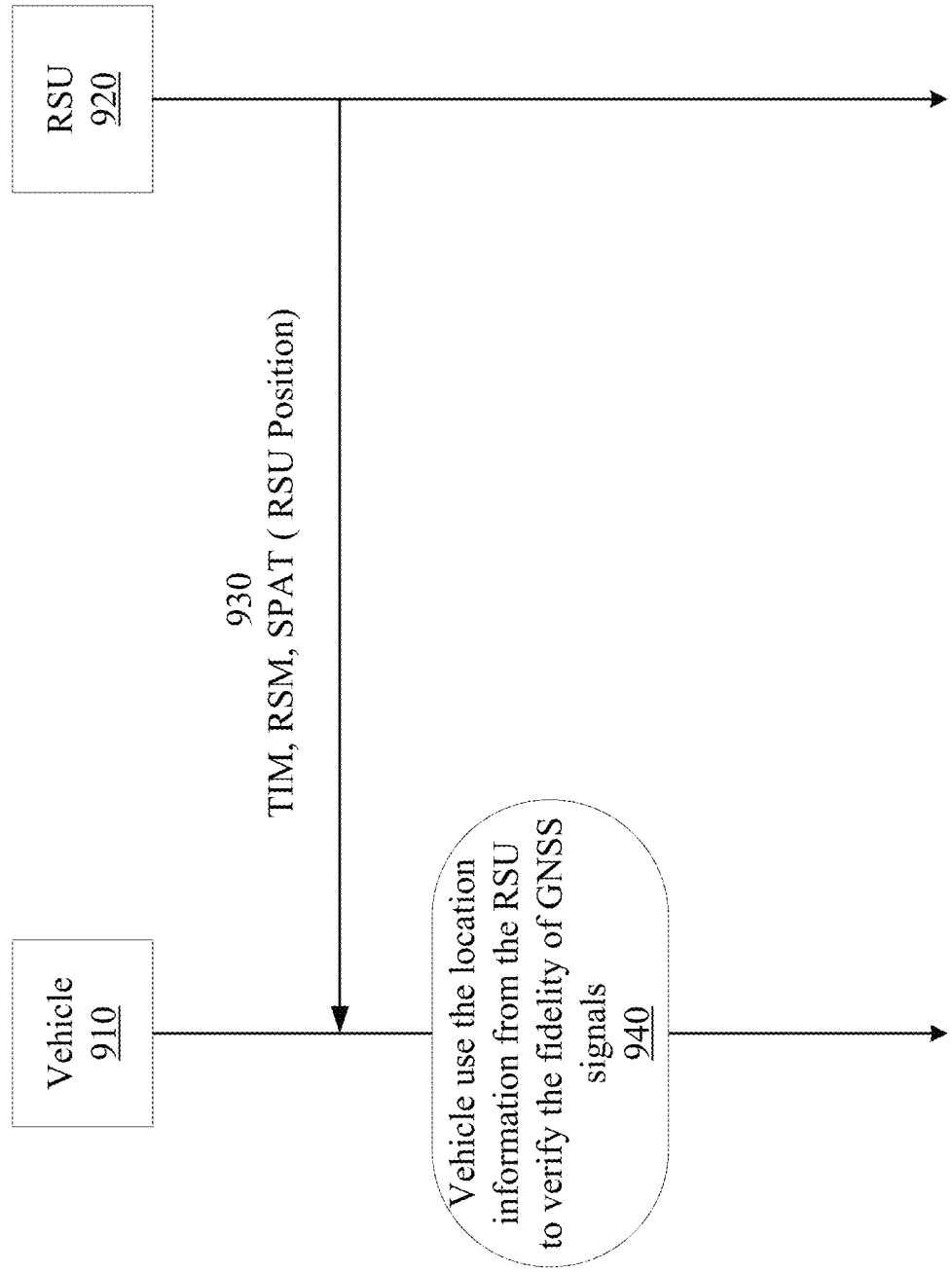
FIG. 9 illustrates an example of a method of verifying the fidelity of GNSS information using RSU position information according to certain embodiments.

FIG. 9 illustrates an example of a method of verifying the fidelity of GNSS information using RSU position information according to certain embodiments. In the illustrated example, a sensor system or a mobile device (e.g., mobile device 802) on a vehicle 910 may use RSU location information to verify the fidelity of the GNSS information. RSU 920 may be a wireless communication device located on the roadside that provides connectivity and information support to passing vehicles, including safety warnings and traffic information. RSU 920 may communicate via, for example, Wi-Fi (IEEE 802.11p) and LTE-V2X. RSU 920 may operate on, for example, the 5.9 GHz Direct Short Range Communications (DSRC) band compatible with vehicle systems to provide very low latency for high speed events, such as crash avoidance. RSU 920 may include a GNSS receiver for determining the time of day and location. RSU 920 may also include a local Wi-Fi hot spot to access a signal controller and an optional LTE cellular backhaul for data upload/download. RSU 920 may have a limited coverage range, such as less than about 1.5 km or 3 km, for example, about 300 or 400 m. Thus, the sensor system or the mobile device on a vehicle that receives messages from RSU 920 may be within the limited coverage range of RSU 920.

The sensor system of vehicle 910 may receive CV2X message 930 from RSU 920. Examples of CV2X messages 930 may include road a safety message (RSM), a Traveler Information Message (TIM), a Signal Phase and Timing (SPAT) message, and the like. As described above, these messages may include location information of RSU 920 and/or other reference objects. At 940, the sensor system may compare the location information from RSU 920 with the location information determined based on GNSS information, and may identify GNSS spoofing when an unexplainable discrepancy is detected. For example, if the discrepancy between the location of RSU 920 provided in CV2X message 930 and the location of vehicle 910 determined based on GNSS signals is greater than the coverage range of RSU 920, the location of vehicle 910 determined based on the GNSS signals may be erroneous, and thus the GNSS signals may be spoofing signals. In some embodiments, the sensor system of vehicle 910 may detect RSU 920 or a reference object, measure the relative location of vehicle 910 with respect to RSU 920 or the reference object (e.g., based on signal strength or using LIDAR, RADAR, or cameras), and determine the approximate location of vehicle 910 based on the measured relative location and the (received) position information of RSU 920 or the reference object. If a large mismatch between the location of vehicle 910 derived from GNSS signals and the location determined based on the CV2X messages from RSU 920 is observed, GNSS spoofing signals may be confirmed.

In some embodiments, after the sensor system on a vehicle identifies potential GNSS spoofing, it may request reference location information from RSUs. The request may be included in, for example, a BSM. As described above, the BSM may also include, for example, information about vehicle position, time, heading, speed, acceleration, predicted path, path history, vehicle type, description, identification, and the like. An RSU may provide information regarding the RSU's own location and/or the calculated vehicle location (e.g., using signal strength, vehicle heading and speed, and other sensor information, such as outputs of a camera). The RSU may compare the GNSS location information received from the vehicle (e.g., in the BSM) with the calculate location to determine the confidence level of the vehicle reported location. Additionally or alternatively, the RSU may send the location information of other objects (e.g., landmark, calibration objects, etc.) that can be used by the sensor system of the vehicle to confirm or dismiss the potential GNSS spoofing.

Figure 10:
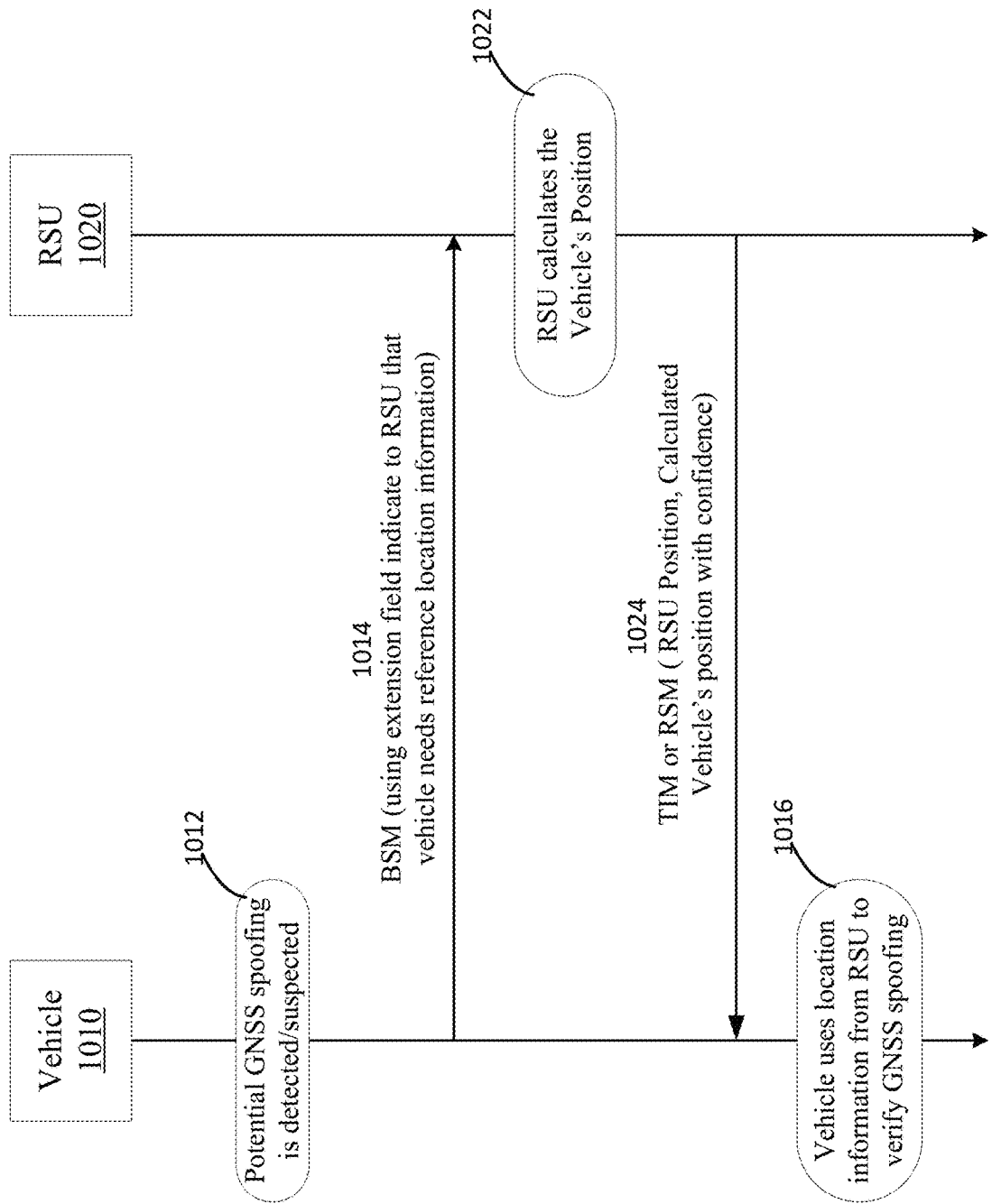
FIG. 10 illustrates another example of a method of verifying the fidelity of GNSS information using a roadside unit (RSU) according to certain embodiments.

FIG. 10 illustrates another example of a method of verifying the fidelity of GNSS information using an RSU according to certain embodiments. In the illustrated example, at 1012, the sensor system on a vehicle 1010 may identify potential GNSS spoofing based on, for example, unexplainable sudden changes in the time, location, frequency, and/or strength information derived from GNSS signals, differences between the time and/or location information derived from GNSS signals and time and/or location information determined using a local clock and other indirect location measurement sensors (e.g., IMUs, LIDARs, RADARs, or wheel sensors), the signal strength of the GNSS signals, or the like. Upon identifying the potential GNSS spoofing, the sensor system on vehicle 1010 may send a CV2X message 1014 (e.g., a BSM) to an RSU 1020. CV2X message 1014 may include, for example, a request for reference location information in an extension field. In some embodiments, vehicle 1010 may also send information of vehicle 1010 to RSU 1020, such as the location of vehicle 1010 derived from GNSS signals, vehicle time, heading, speed, acceleration, predicted path, path history, and other sensor information (e.g., outputs of a camera, IMU, LIDAR, RADAR, etc.). In some embodiments, RSU 1020 may obtain at least some of such information from other RSUs, other vehicles, or sensors on RSU 1020.

At 1022, RSU 1020 may calculate the location of vehicle 1010 based on the received information. For example, RSU 1020 may determine an estimated location of vehicle 1010 based on the received signal strength, the direction and speed of vehicle 1010, or other sensor data (e.g., LIDAR, RADAR, or camera data). In some embodiments, RSU 1020 may compare the location of vehicle 1010 reported in the CV2X messages from vehicle 1010 and the estimated location determined by RSU 1020. Based on the comparison, RSU 1020 may determine whether the GNSS signals are spoofing signals. In some embodiments, RSU 1020 may determine a confidence level of the location of vehicle 1010 reported by vehicle 1010 or the location of vehicle 1010 calculated by RSU 1020. RSU 1020 may send the requested reference location information to vehicle 1010 through a CV2X message 1024. CV2X message 1024 may include, for example, RSM, TIM, or the like. CV2X message 1024 may include, for example, location information of RSU 1020, calculated location of vehicle 1010, the confidence level of the location of vehicle 1010 reported by vehicle 1010 or calculated by RSU 1020, and/or locations of other reference objects, such as bridges, landmarks, roadside markers, road mile markers, or other structures.

At 1016, vehicle 1010 may receive CV2X message 1024 from RSU and use the reference location information included in CV2X message 1024 to determine whether the received GNSS signals are spoofing signals. For example, vehicle 1010 may determine whether the received GNSS signals are spoofing signals based on the confidence level provided by RSU 1020 or by comparing the location of vehicle 1010 determined by RSU 1020 and the location of vehicle 1010 determined based on GNSS signals. In some embodiments, vehicle 1010 may determine whether the received GNSS signals are spoofing signals based on the locations of other reference objects provided in the CV2X messages and reference objects detected by the sensors on vehicle 1010, such as a camera, LIDAR, or RADAR. For example, vehicle 1010 may determine that the received GNSS signals are spoofing signals based on determining that the location derived from the GNSS signal is out of the coverage range of RSU 1020. In another example, if the CV2X message indicates that a landmark or another reference object is at a certain location, and the sensors of vehicle 1010 detect such a landmark or reference object, but the received GNSS signals indicate that the vehicle is at a location further away from the location of the landmark or reference object indicated in the CV2X message, vehicle 1010 may determine that the GNSS signals are spoofing signals. In yet another example, the sensor system of vehicle 1010 may detect the landmark or reference object, measure the relative location of vehicle 1010 with respect to the landmark or reference object (e.g., based on signal strength or using a LIDAR, a RADAR, or cameras), and determine the location of vehicle 1010 based on the measured relative location and the (received) position information of the landmark or reference object. If a sufficiently large mismatch between the location derived from GNSS signals and the location determined based on the CV2X messages from RSU 1020 is observed, GNSS spoofing signals may be confirmed.

After the confirmation of the GNSS spoofing signals, the sensor system may take measures to mitigate the GNSS spoofing signals. For example, the sensor system may ignore the GNSS signals and use data from other sensor to determine the location of vehicle 1010, such as using the dead reckoning techniques and data from IMUs, LIDARs, RADARs, wheel sensors, ultrasonic sensors, and the like. The sensor system may also use data from RSUs to estimate the location of vehicle 1010. In some embodiments, the location of vehicle 1010 may be determined using wireless signals, such as Wi-Fi signals, WAN signals, 5G NR signals (e.g., positioning reference signals), and the like.

Figure 11:
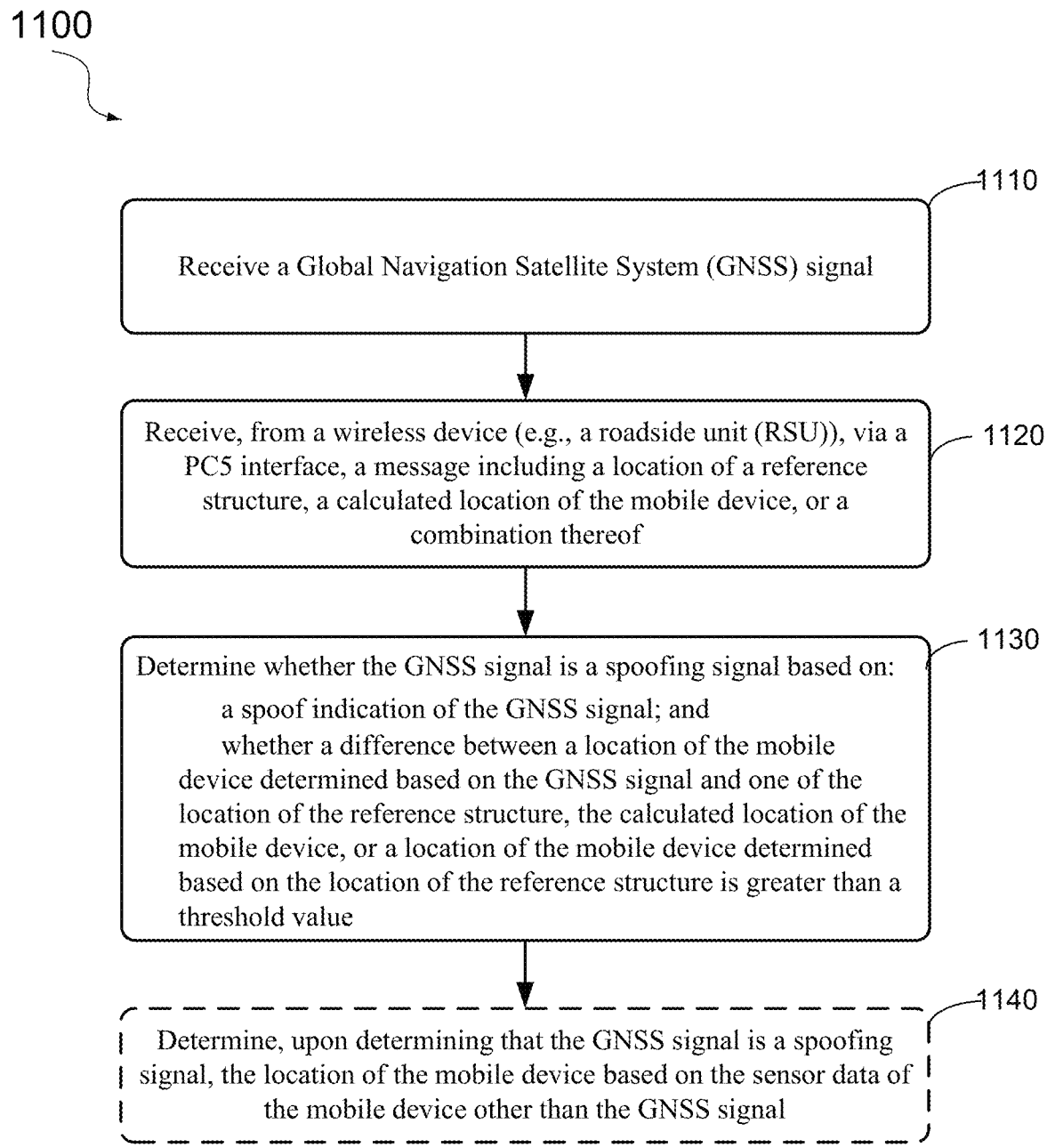
FIG. 11 includes a flowchart illustrating an example of a method of detecting and mitigating GNSS spoofing signals according to certain embodiments.

FIG. 11 includes a flowchart 1100 illustrating an example of a method of detecting and mitigating GNSS spoofing signals according to certain embodiments. It is noted that the operations illustrated in FIG. 11 provide particular techniques to detect and mitigate the impact of spoofing signals on the positioning. Other sequences of operations can also be performed according to alternative embodiments. For example, alternative embodiments may perform the operation in a different order. Moreover, the individual operations illustrated in FIG. 11 can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in flowchart 1100 may include, for example, a GNSS receiver and/or a processing unit on a UE or a vehicle described herein, which may include hardware and/or software components for performing the described functionality. For example, means for performing the operations in flowchart 1100 may include various components of the sensor system of vehicle 102, UE 105, vehicle 804, mobile device 802, RSU 812, vehicle 910, RSU 920, vehicle 1010, RSU 1020, RSUs 1225, vehicle 1280, 1290, 1300, or 1400, proxy device 1500, and the like.

At block 1110, a mobile device (e.g., a UE) may receive a GNSS signal. The mobile device may be a vehicle or another mobile device (e.g., smart phone) described throughout the present disclosure. The mobile device may include, for example, a GNSS receiver, one or more cameras, one or more LIDARs, one or more RADARs, one or more IMUs, one or more ultrasonic sensors, one or more wheel sensors, and the like, as described above, for example, with respect to FIG. 4. The GNSS signal may be from a satellite or may be from a spoofer, such as a satellite-based or a ground-based spoofer. As described above, the GNSS signal received by the mobile device may include, for example, time information (e.g., GNSS time of a satellite), the identification of a satellite, a PRN associated with the satellite, and the like. The GNSS signal received by the mobile device may have a certain signal strength (signal level), a certain carrier frequency, and a certain phase.

The mobile device may identify a potential spoofing signal in an environment. As described above, the spoofing signal may be detected based on a sudden change of the time and/or location derived from GNSS signals or a sudden change in the difference between the time and/or location derived from GNSS signals and the time and/or location determined using other techniques. The spoofing signal may also be detected based on the signal strength of the received GNSS signal, a frequency of the GNSS signal, or a change in the frequency of the GNSS signal. For example, a GNSS signal may be identified as a potential spoofing signal by determining a change of a GNSS time derived from the GNSS signal over a previously determined GNSS time for a same satellite greater than a threshold value, a change of a location of the mobile device determined based on the GNSS signal over a previously determined location of the mobile device greater than a threshold value, a difference between the GNSS time and a local time of the mobile device greater than a threshold value, a difference between the location of the mobile device determined based on the GNSS signal and a location of the mobile device determined based on sensor data of the mobile device other than the GNSS signal greater than a threshold value, a signal strength of the GNSS signal greater than a threshold value (e.g., a GNSS signal strength level in open sky condition), a difference between the signal strength of the GNSS signal and a signal strength of a previous GNSS signal that is associated with the same satellite as the GNSS signal greater than a threshold value, a difference between a frequency of the GNSS signal and a frequency of a previous GNSS signal associated with the same satellite greater than a threshold value, or a combination thereof. As described above, the mobile device may determine a predicted position fix based on sensor data (e.g., using a position filter, such as a Kalman filter), based on Wi-Fi signals, based on WAN signals, or based on cellular communication signals. The sensor data may include data collected by a RADAR, a camera, a LIDAR, a motion sensor, an IMU, a wheel sensor, an ultrasonic sensor, or a combination thereof.

At block 1120, the mobile device may receive, from a wireless device (e.g., an RSU), via a PC5 interface, a message (e.g., a CV2X message or another wireless message) including a location of a reference structure, a calculated location of the mobile device, or a combination thereof. The reference structure may include, for example, the RSU, a bridge, a landmark, a building, or a roadside marker. In some embodiments, the CV2X message may include a confidence level of the calculated location of the mobile device or a location of the mobile device determined based on the GNSS signal. In some embodiments, the CV2X message may include an indication that a difference between the location of the mobile device determined based on the GNSS signal and the calculated location of the mobile device is greater than a threshold value. The CV2X message may include, for example, a road safety message (RSM), a Traveler Information Message (TIM), or a Signal Phase and Time (SPAT) message. In some embodiments, the mobile device may send a request to the RSU for reference location information. The request may be included in a CV2X Basic Safety Message (BSM) that includes location information of the mobile device, such as the location of the mobile device determined based on GNSS signals. In some embodiments, the location information of the mobile device may include vehicle time, heading (direction), speed, acceleration, predicted path, path history, and other sensor information (e.g., outputs of a camera, IMU, LIDAR, RADAR, etc.). In some embodiments, the RSU may calculate a location of the mobile device based on at least one of the location information of the mobile device included in the CV2X BSM (e.g., vehicle direction and speed), a signal strength of the CV2X BSM, or an output of a sensor (e.g., a camera) associated with the RSU. In some embodiments, the RSU may calculate the confidence level of the calculated location of the mobile device or the location of the mobile device reported in the CV2X BSM.

At block 1130, the mobile device may determine whether the GNSS signal is a spoofing signal based on: a spoof indication of the GNSS signal, and whether a difference between a location of the mobile device determined based on the GNSS signal and one of the location of the reference structure, the calculated location of the mobile device, or a location of the mobile device determined based on the location of the reference structure is greater than a threshold value. For example, if the discrepancy between the location of the RSU provided in the CV2X message and the location of the mobile device determined based on GNSS signals is much larger than the coverage range of the RSU, the location of the vehicle determined based on the GNSS signals may be erroneous, and thus the GNSS signals may be spoofing signals. In another example, if the CV2X message indicates that a reference structure detected by the mobile device is at a certain location, but the received GNSS signals indicate that the mobile device is at a location further away from the location of the reference structure indicated in the CV2X message, mobile device may determine that the GNSS signals are spoofing signals. In yet another example, the mobile device may detect the reference structure, measure the relative location of the mobile device with respect to the reference structure (e.g., based on signal strength or using a LIDAR, a RADAR, or cameras), and determine the location of the mobile device based on the measured relative location and the (received) position information of the reference structure. If a sufficiently large mismatch between the location derived from GNSS signals and the location determined based on the CV2X messages from the RSU is observed, GNSS spoofing signals may be confirmed. In yet another example, if a difference between the location of the mobile device determined based on the GNSS signals and the calculated location of the mobile device included in the message received from the wireless device is greater than a certain value, the GNSS signals may be determined to be spoofing signals.

Optionally, at block 1140, upon determining that the GNSS signal is a spoofing signal, the mobile device may determine the location of the mobile device based on the sensor data of the mobile device other than the GNSS signal. For example, the mobile device may determine its location using the dead reckoning technique descried above based on the sensor data from IMUs, a LIDAR, a RADAR, ultrasonic sensors, wheel sensors, and the like. In some embodiments, the mobile device may determine its location based on, for example, Wi-Fi signals, WAN signals, or 5G NR signals (e.g., positioning reference signals).

Example systems, devices, methods, and apparatuses according to this disclosure may be used to detect and mitigate against GNSS spoofing signals. Such systems may enable a positioning system to be more resistant to spoofing attacks and to adjust to potential spoofing attacks without losing the ability to properly report position or to navigate safely.

FIGS. 12-15 illustrate systems, structural devices, vehicle components, and other devices, components, and systems that can be used to implement the techniques provided herein for detecting, verifying, and mitigating GNSS spoofing signals.

Figure 12:
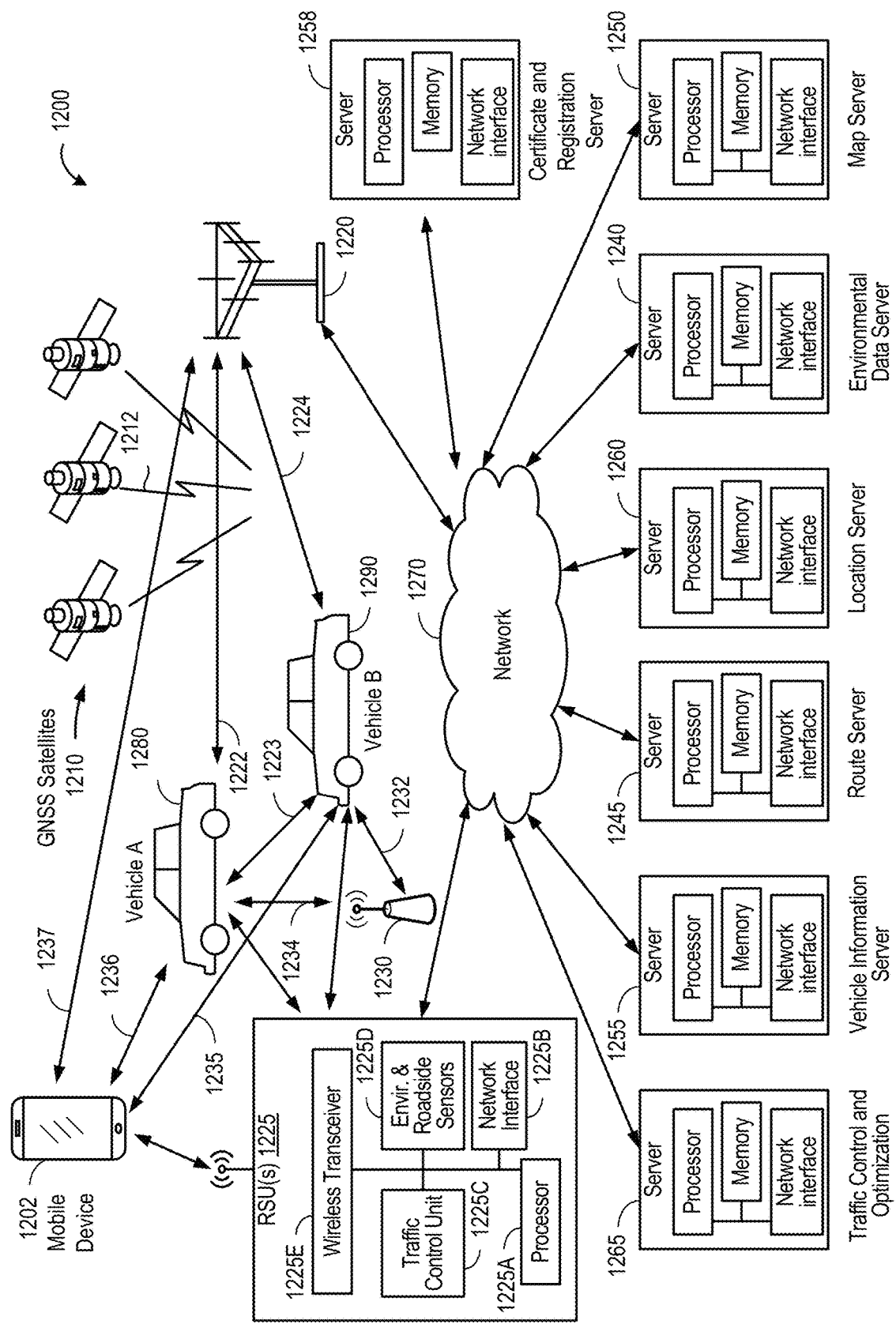
FIG. 12 illustrates a system in which V2X capable devices (e.g., vehicles, proxy devices, RSUs, servers, etc.) may communicate over various networks according to certain embodiments.

FIG. 12 is an illustration of a system 1200 in V2X capable devices (e.g., vehicles, proxy devices, RSUs, servers, etc.) may communicate over various networks, according to an embodiment. In an embodiment, vehicle A 1280 may communicate, using V2X or other wireless communication transceiver over link 1223, with V2X or otherwise communication-transceiver-enabled vehicle B 1290, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, vehicle capabilities, occupant metadata, and to exchange other V2X vehicle status steps that may not be covered in the V2X capability data elements. In an embodiment, vehicle A 1280 may also communicate with vehicle B 1290 through a network, for example, via wireless signals 1222 to/from base station 1220 and/or via wireless signals 1232 to/from an access point 1230, or via one or more communication-enabled RSU(s) 1225, any of which may relay communication, information and/or convert protocols for use by other vehicles, such as vehicle B 1290, particularly in an embodiment where vehicle B 1290 is not capable of communicating directly with vehicle A 1280 in a common protocol. In an embodiment, RSU(s) may include various types of roadside beacons, traffic and/or vehicular monitors, traffic control devices, and location beacons.

In some embodiments, vehicle A 1280 may lack V2X communication components (or such communications components are faulty and/or disabled) such that it cannot send and/or receive V2X data elements with other entities of system 1200 (e.g., vehicle B 1290, RSU(s) 1225, servers 1240, 1245, 1250, 1255, 1260, 1265, 1268, etc.). A vehicle that is unable to participate in V2X communications is referred to herein as a "legacy vehicle." Thus, in some embodiments, vehicle A 1280 is a legacy vehicle. In some embodiments, mobile device 1202 (an example of the proxy device 1400 of FIG. 14), may be configured to act as a proxy on behalf of vehicle A 1280. Mobile device 1202 can be configured to send and/or receive V2X messages to/from any suitable combination of the entities of the system 1200 (e.g., vehicle B 1290, RSU(s) 1225, servers 1240, 1245, 1250, 1255, 1260, 1265, 1268, etc.). Mobile device 1202 may be configured to send and/or receive wireless messages in various protocols with vehicle A 1280 (or any suitable component of vehicle A 1280) by using various Wide Area Network (WAN), Wireless Local Area Network (WLAN), and/or Personal Area Network (PAN) protocols to communicate over a wireless communication network. In an embodiment, the mobile device 1202 may include various combinations of WAN, WLAN and/or PAN transceivers. In an embodiment, these transceivers may include a Bluetooth® transceiver, a ZigBee transceiver, and/or other PAN transceiver. A local transceiver, a WAN wireless transceiver, and/or a mobile wireless transceiver may include a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with a mobile device 1202 over a wireless link, and claimed subject matter is not limited in this respect.

In some embodiments, mobile device 1202 may communicate with vehicle A 1280 via a PAN such as a Bluetooth network. In some embodiments, mobile device 1202 may communicate with vehicle A 1280 via link 1236 or through a network, for example, via wireless signals 1237 to/from base station 1220 and/or via wireless signals 1234 to/from an access point 1230, or via one or more communication-enabled RSU(s) 1225, any of which may relay communication, information and/or convert protocols for use by other vehicles, such as vehicle B 1290, particularly in an embodiment where vehicle B 1290 is not capable of communicating directly with vehicle A 1280 in a common protocol.

Mobile device 1202 may be configured to receive any suitable vehicle data from any suitable combination of components of vehicle A 1280 (e.g., vehicle sensor(s) 1145, vehicle motion sensor(s) 1440, camera(s) 1435, RADAR 1453, LIDAR 1450, power and drive systems and related systems 1475, input/output device(s) 1468, and/or systems 1455) via one or more communication networks. In some embodiments, mobile device 1202 may be configured to receive vehicle capabilities and/or occupant metadata from one or more interfaces of the mobile device 1202, based on one or more images captured by the mobile device 1202, from vehicle A 1280, or any suitable combination of the above. Mobile device 1202 may be configured with one or more sensors and may exchange locally acquired sensor data with the vehicle. In some embodiments, the mobile device 1202 may be configured to interface (send and/or receive data) with the input/output device(s) 1468 of FIG. 14). For example, the mobile device 1202 may present data via the input/output device(s) 1468 and/or the mobile device 1202 may receive data (e.g., user input) collected and provided by the input/output device(s) 1468 of vehicle A 1280.

It should be appreciated that any suitable sensor of the sensors/components 1435, 1440, 1445, 1450, 1453 may be installed after market. Thus, any of the sensors/components 1435, 1440, 1445, 1450, 1453 may be an example of a third-party sensor (e.g., of the third-party sensor(s) 835 of FIG. 8).

Mobile device 1202 may be configured to generate driver assistance information (e.g., the driver assistance information 142 of FIG. 1) based at least in part on received V2X message data. By way of example, mobile device 1202 may be configured with code (e.g., vehicle processing module 1465 of FIG. 14) that, when executed, causes visual and/or audible data (e.g., driver assistance information) to be generated that indicates at least a portion of the data received via one or more V2X messages. As a simplistic example, the mobile device 1202 may receive a V2X message indicating that the vehicle located in from of vehicle A 1280 is breaking hard. The mobile device 1202 may determine the V2X message is relevant to vehicle A 1280 and generate visual and/or audible data that may be presented at the mobile device 1202 via a display and/or a speaker of the mobile device and/or at a display and/or speaker of the vehicle A 1280 (e.g., via input/output device(s) 1468). The visual and/or audible data may indicate the breaking is occurring up ahead, alerting the driver to the chance of collision.

Mobile device 1202 may be configured to store vehicle and/or occupant metadata provided by a user or received as V2X message data. By way of example, mobile device 1202 may be configured with code (e.g., the vehicle processing module 1465 of FIG. 14) that may perform any suitable operations discussed herein with respect to managing, obtaining, storing, classifying, or otherwise interacting with vehicle capabilities and/or occupant metadata. In some embodiments, the mobile device 1202 may determine the V2X message is relevant to vehicle A 1280 based at least in part on comparing vehicle capabilities and/or occupant metadata received from a V2X message with vehicle capabilities and/or occupant metadata stored at the mobile device. In some embodiments, the vehicle processing module 1465 may be configured with code, that when executed, obtains occupant metadata from one or more nearby user devices (e.g., a plurality of mobile devices).

Mobile device 1202 may be configured to receive any suitable V2X data message from any suitable V2X capable device of the system 1200. In some embodiments, the mobile device 1202 may correlate the received data with any suitable data stored locally at the mobile device 1202 (e.g., vehicle capabilities, occupant metadata, sensor data, etc.) and may store data corresponding to an entity and received from different sources in a single data container and/or in associated data containers.

In some embodiments, the mobile device 1202 may be configured to transmit any suitable data (e.g., vehicle capabilities, occupant metadata, sensor data, trust values, weather data, road conditions, objects detect, etc.) via any suitable V2X data message. In some embodiments, these data messages may be broadcast or the data messages may be directed (e.g., utilizing a unique identifier and/or one or more attributes of the intended recipient). In some embodiments, the mobile device 1202 may be configured to obtain any suitable enrollment certificate and/or temporary transmission certificates for itself and/or on behalf of any suitable number of devices (e.g., third-party sensor(s) 835 of FIG. 8) according to the methods 200 and 300 discussed above.

In some embodiments, the mobile device 1202 may act in concert with one or more other mobile devices for data collection and/or transmission purposes. By way of example, the mobile device 1202 may perform the functionality discussed above in connection with either of the mobile devices of FIG. 4.

Figure 14:
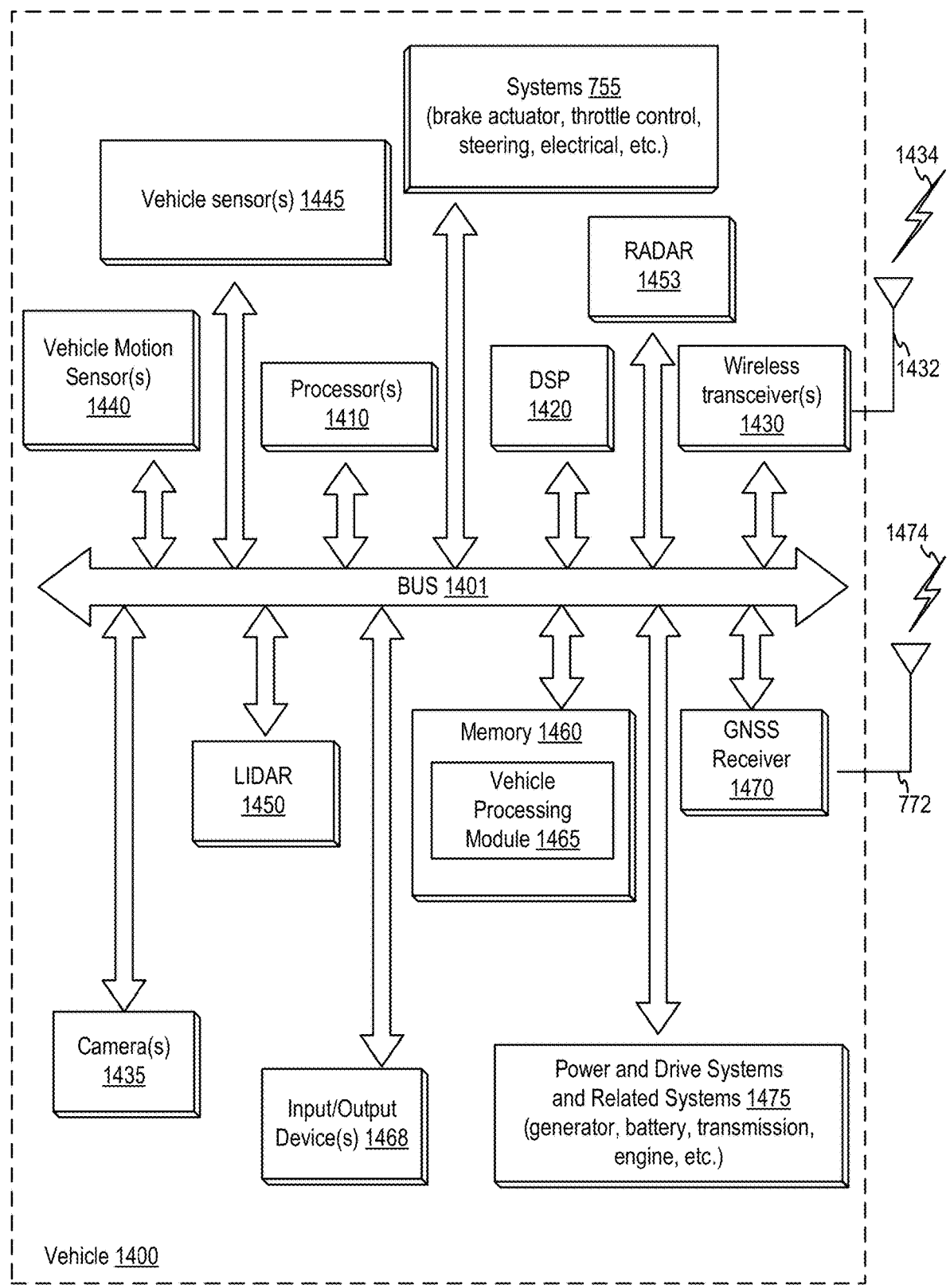
FIG. 14 is a block diagram of various hardware and software components of a vehicle according to certain embodiments.

Generally, any of the functionality discussed in FIGS. 1-8 as being performed by a mobile device may be performed by mobile device 1202 (e.g., by executing code of the vehicle processing module 1465 of FIG. 14).

Mobile device 1202 may communicate, using V2X or other wireless communication transceiver over link 1235, with V2X or otherwise communication-transceiver-enabled vehicle B 1290, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, vehicle capabilities, occupant metadata, and/or calculated status, and to exchange other V2X vehicle status steps that may not be covered in the V2X capability data elements. In an embodiment, mobile device 1202 may also communicate with vehicle B 1290 through a network, for example, via wireless signals 1237 to/from base station 1220 and/or via wireless signals 1234 to/from an access point 1230, or via one or more communication-enabled RSU(s) 1225, any of which may relay communication, information and/or convert protocols for use by other vehicles, such as vehicle B 1290, particularly in an embodiment where vehicle B 1290 is not capable of communicating directly with vehicle A 1280 in a common protocol.

In an embodiment, RSU(s) 1225 may have a processor 1225A configured to operate wireless transceiver 1225E to send and receive wireless messages, for example, BSM or Cooperative Awareness Messages (CAM) or other V2X messages to/from vehicle A 1280 and/or vehicle B 1290 and/or mobile device 1202, from base station 1220 and/or access point 1230. For example, wireless transceiver 1225E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 1225 may contain one or more processors 1225A communicatively coupled to wireless transceiver 1225E and memory, and may contain instructions and/or hardware to perform as a traffic control unit 1225C and/or to provide and/or process environmental and roadside sensor information 1225D or to act as a location reference for GNSS relative location between it and vehicles. In an embodiment, RSU(s) 1225 may contain a network interface 1225B (and/or a wireless transceiver 1225E), which, in an embodiment, may communicate with external servers such as traffic optimization server 1265, vehicle information server 1255, and/or environmental data server 1240. In an embodiment, wireless transceiver 1225E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 1225E may include various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may include a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 1225 over a wireless link, and claimed subject matter is not limited in this respect.

RSU(s) 1225 may receive location, status, GNSS and other sensor measurements, and capability information from vehicle A 1280 and/or vehicle B 1290 and/or mobile device 1202 such as GNSS measurements, sensor measurements, velocity, heading, location, stopping distance, priority or emergency status and other vehicle-related information such as vehicle capabilities, occupant metadata, and the like. In some embodiments, mobile device 1202 may obtain such data from vehicle A 1280. In an embodiment, environmental information such as road surface information/status, weather status, and camera information may be gathered and shared with vehicles, either via point to point or broadcast messaging. RSU(s) 1225 may utilize received information, via wireless transceiver 1225E, from vehicle A 1280 and/or vehicle B 1290 and/or mobile device 1202, environmental and roadside sensors 1225D, and network information and control messages from, for example, traffic control and optimization server 1265 to coordinate and direct traffic flow and to provide environmental, vehicular, safety and announcement messages to vehicle A 1280 and vehicle B 1290. In an embodiment, RSU(s) 1225 may be configured to request and/or receive receipt enrollment certificates, transmission enrollment certificates, and/or one or more temporary transmission certificates, or any suitable combination of the above from the certificate and registration server 1258. In some embodiments, the certificate and registration server 1258 may perform any suitable functionality discussed above with respect to the certificate authority 146 and/or the registration authority 148 of FIGS. 1-4 and 8.

Processor 1225A may be configured to operate a network interface 1225B, in an embodiment, which may be connected via a backhaul to network 1270, and which may be used, in an embodiment, to communicate and coordinate with various centralized servers such as a centralized traffic control and optimization server 1265 that monitors and optimizes the flow of traffic in an area such as within a city or a section of a city or in a region. Network interface 1225B may also be utilized for remote access to RSU(s) 1225 for crowd sourcing of vehicle data, maintenance of the RSU(s) 1225, and/or coordination with other RSU(s) 1225 or other uses. RSU(s) 1225 may have a processor 1225A configured to operate traffic control unit 1225C which may be configured to process data received from vehicles such as vehicle A 1280 and vehicle B 1290 such as location data, stopping distance data, road condition data, identification data and other information related to the status and location of nearby vehicles and environment. RSU(s) 1225 may have a processor 1225A configured to obtain data from environmental and roadside sensors 1225D, which may include temperature, weather, camera, pressure sensors, road sensors (for car detection, for example), accident detection, movement detection, speed detection and other vehicle and environmental monitoring sensors.

In an embodiment, vehicle A 1280 may also communicate with mobile device 1202 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 1202. In an embodiment, vehicle A 1280 may communicate with mobile device 1202 using WAN related protocols through a WAN network, such as via WAN base station 1220 or using Wi-Fi either directly peer to peer or via a Wi-Fi access point. Vehicle A 1280 and/or vehicle B 1290 may communicate using various communication protocols. In an embodiment, vehicle A 1280 and/or vehicle B 1290 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A 1280 may communicate over WAN networks using WAN protocols via base station 1220 or with wireless LAN access point 1230 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 1280 and/or vehicle B 1290 and/or mobile device 1202, in an embodiment, may contain one or more GNSS receivers (e.g., GNSS receiver 1470 for vehicle A and/or B, GNSS receiver 1480 for mobile device 1202) for reception of GNSS signals 1212, from GNSS satellites 1210, for location determination, time acquisition and time maintenance. Various GNSS systems may be supported alone or in combination, using GNSS receiver xxx or other receiver, to receive signals from Beidou, Galileo, GLONASS, and/or Global Positioning System (GPS), and various regional navigational systems such as Quasi-Zenith Satellite System (QZSS) or Indian Regional Navigation Satellite System (IRNSS). Other wireless systems may be utilized such as those depending on beacons such as, in an example, one or more RSU(s) 1225, one or more wireless LAN access point 1230 or one or more base stations 1220. Various GNSS signals 1212 may be utilized in conjunction with car sensors to determine location, velocity, proximity to other vehicles such as between vehicle A 1280 and vehicle B 1290.

In an embodiment, vehicle A and/or vehicle B may access GNSS measurements and/or locations determined at least in part using GNSS as provided by mobile device 1202, which, in an embodiment would also have GNSS, WAN, Wi-Fi and other communications receivers and/or transceivers. In an embodiment, vehicle A 1280 and/or vehicle B 1290 may access GNSS measurements (such as pseudorange measurements, Doppler measurements and satellite IDs) and/or locations determined at least in part using GNSS as provided by mobile device 1202 as a fallback in case GNSS receiver 770 fails or provides less than a threshold level of location accuracy.

Vehicle A 1280 and/or Vehicle B 1290 and/or mobile device 1202 (as proxy for vehicle A 1280) may access various servers on the network such as vehicle information server 1255, route server 1245, location server 1260, map server 1250, environmental data server 1240, and certificate and registration server 1268. In some embodiments, vehicle A 1280 and/or vehicle B 1290 may be configured to request and/or receive receipt enrollment certificates, transmission enrollment certificates, and/or one or more temporary transmission certificates, or any suitable combination of the above from the certificate and registration server 1258.

Vehicle information server 1255, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 1255 may also provide information in regard to vehicle size, shape, capabilities, identification, ownership, occupancy, and/or determined location point (such as, for example, the location of the GNSS receiver) and the location of the car boundaries relative to the determined location point.

Route server 1245, may receive current location and destination information, and provide routing information for the vehicle, map data, alternative route data and/or traffic and street conditions data.

Location server 1260, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 1250 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 1240 may, in an embodiment, provide weather and/or road related information, traffic information, terrain information, and/or road quality & speed information and/or other pertinent environmental data.

In an embodiment, Vehicles 1280 and 1290 and mobile devices 1202, in FIG. 12, may communication over network 1270 via various network access points such as wireless LAN access point 1230 or wireless WAN base station 1220 over network 1270. Any suitable combination of vehicles 1280, 1290, and mobile devices 1202 may also, in some embodiments, communicate directly between devices, between vehicles and device to vehicle and vehicle to device using various short range communications mechanisms to communicate directly without going over network 870, such as via Bluetooth, Zigbee and 5G new radio standards.

Figure 13:
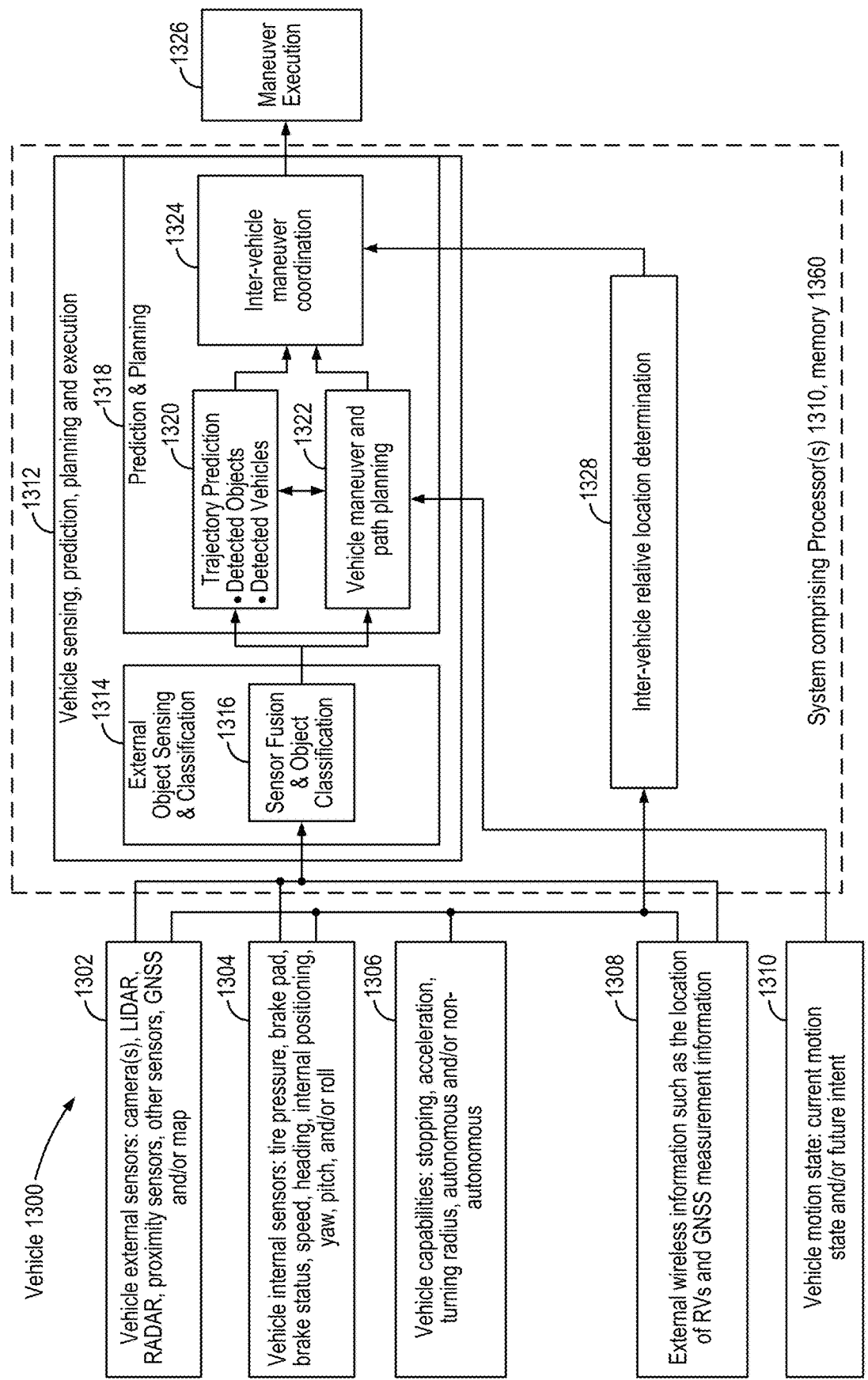
FIG. 13 includes a functional block diagram of a vehicle according to certain embodiments.

FIG. 13 includes a functional block diagram of a vehicle 1300, according to an embodiment. The vehicle 1300 we correspond to vehicle 134 and/or RV 140 of FIG. 1, as described in the embodiments above. Moreover, hardware and/or software components for executing the blocks shown in FIG. 13 are illustrated in FIG. 14 and described in more detail below.

As shown in FIG. 13, vehicle 1300 may receive vehicle and environment information from vehicle external sensors in block 1302, vehicle internal sensors in block 1304, vehicle capabilities in block 1306, external wireless information such as the location of RVs and GNSS measurement information in block 1308 (from the environment, from other vehicles, from RSU(s), from system servers) and/or from vehicle motion state 1310 (describing current and/or future motion states). The messages received by the vehicle 134 and/or RV 140 of FIG. 1 described in the embodiments above, for example, may convey the data provided in blocks 1308 and/or 1310. The received vehicle, sensor, and environment information may, in an embodiment, be processed in one or more processor(s) 1410, DSP 1420 and memory 1460 (further described in FIG. 1), connected and configured to provide external object sensing and classification, prediction and planning, and maneuver execution, as well as to determine and update V2X or other wireless data element values, including GNSS data element values, and to transmit, via one or more wireless transceiver(s) 1430, messaging including the determined data elements. The messaging and data elements may be sent and received via various means, protocols and standards, such as via SAE or European Telecommunications Standards Institute (ETSI) CV2X messages and data elements or other wireless and wireless V2X protocols supported by wireless transceiver(s) 1430. In some embodiments, vehicle 1400 may be a legacy vehicle, lacking the ability to exchange messages and/or data elements via CV2X messages and/or via wireless V2X protocols. Thus, in some embodiments, vehicle 1400 may receive V2X data elements from CV2X messages received by the mobile device 1202 of FIG. 12 (e.g., an example of the proxy device 1500 discussed below in connection with FIG. 15). In embodiments in which the mobile device 1202 acts as a proxy for the vehicle 1300, any suitable data received by the vehicle 1300 may additionally and/or alternatively be received by the vehicle 1300 from the mobile device 1202 (after the mobile device 1202 has received the data from the source of the data such as the servers 1240, 1245, 1250, 1255, 1260, 1265, and/or 1268 of FIG. 12, the RSU(s) 1225, vehicle B 1290, and the like).

Inter-vehicle relative location determination block 1328 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 1300 to determine an approximate relative location and/or an approximate range between vehicles.

In an embodiment, other vehicle-related input sources, such as servers 1255, 1245, 1260, 1250, and 1240 of FIG. 12, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination to determine maneuver execution. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 1250 may be utilized in conjunction with relative and/or absolute data from neighboring vehicles and/or from RSU(s) 1225 to determine high confidence absolute location for a plurality of vehicles and relative location with respect to the road/map. For example, if vehicle A 1280 of FIG. 12 has high accuracy/high confidence location than other vehicles in communication with vehicle A 1280, such as vehicle B 1290 of FIG. 12 may use GNSS information for a highly accurate relative location and the highly accurate location from vehicle A 1280 sent to vehicle B 1290 to determine a highly accurate location for vehicle B 1290, even if the systems of vehicle B 1290 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 1250 is accurate, the ability to propagate highly accurate location data from vehicle A 1280 to surrounding vehicles such as vehicle B 1290 enables the surrounding vehicles to also accurately determine their relative location versus the map data, even in otherwise troublesome signal/location environments. Vehicle information server 1255 may provide vehicle information such as size, shape, and antenna location which may be utilized, for example, by vehicle A or other vehicles to determine not just the relative location between the GNSS receiver on vehicle A 1280 and, for example, vehicle B 1290, but also the distance between the closest points of Vehicle A 1280 and Vehicle B 1290. In an embodiment, traffic information from the traffic control and optimization server 1265 may be utilized to determine overall path selection and rerouting, used in conjunction with route server 1245 (in an embodiment). In an embodiment, environmental data server 1240 may provide input on road conditions, black ice, snow, water on the road and other environmental conditions which may also impact the decisions and decision criteria in inter-vehicle maneuver coordination block 1324 and maneuver execution block 1326. For example, in icy or rainy conditions, the vehicle 1300 may execute and/or request increased inter-vehicle distance from adjacent vehicles or may choose route options that avoid road hazard conditions such as black ice and standing water.

Block 1328 may be implemented using various dedicated or generalized hardware and software, such as using a processor (an example of processor(s) 1410 or DSP 1420 of FIG. 14) and memory 1460 (again, as shown in FIG. 14) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as 5G New Radio (NR), Ultra-wide band (UWB), LIDAR, RADAR, SONAR, camera measurements, or any combination thereof. In an embodiment, some or all of blocks 1302, 1304, 1306, 1308 and/or 1310 may have dedicated processing cores, for example, to improve performance and reduce measurement latency. In an embodiment, some or all of blocks 1302, 1304, 1306, 1308 and/or 1310 may share processing with block 1328.

Vehicle external sensors in block 1302 may include, in some embodiments, cameras, LIDAR, RADAR, proximity sensors, other sensors (e.g., devices for detecting weather, rain, snow, pressure changes, vertical directionality, ground position, proximity detection, etc.), GNSS receivers and received data used with the sensors such as map data, environmental data, location, route and/or other vehicle information such as may be received from other vehicles, devices and servers such as, in an embodiment, map server 1250, route server 1245, vehicle information server 1255, environmental data server 1240, location server 1260, and/or from associated devices such as mobile device 1202, which may be present in or near to the vehicle such as vehicle A 1280. For example, in an embodiment, mobile device 1202 may provide an additional source of GNSS measurements, may provide an additional source of motion sensor measurements, or may provide network access as a communication portal to a WAN, Wi-Fi or other network, and as a gateway to various information servers such as servers 1240, 1245, 1250, 1255, 1260, 1265, and/or 1268.

It is understood that the vehicle 1300 may contain one or a plurality of cameras. In an embodiment, a camera may be front facing, side facing, rear facing or adjustable in view (such as a rotatable camera). As shown in FIG. 14, for example, there may be multiple cameras facing the same plane. For example, the cameras 1406 may be one of two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1404 may be roof mounted and rotating or may be focused on a particular point of view (such as front facing, rear facing, side facing). LIDAR 1404 may be solid state or mechanical. Proximity sensors may be ultrasonic, RADAR-based, light-based (such as based on infrared range finding), and/or capacitive (surface touch oriented or capacitive detection of metallic bodies). Other sensors may include various sensing capabilities and technologies such as barometric pressure sensors, devices for detecting weather, pressure changes, vertical directionality, ground position, proximity detection, moisture detectors, rain and/or snow sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors in block 1304 may include wheel sensors 412 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors in block 1304 and vehicle external sensors in block 1302 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 1328 to determine vehicle location. The car status values derived from measurements from internal and external sensors may be further combined with car status values and/or measurements from other sensor systems using a general or applications processor. For example, blocks 1328 and/or 1324 or may be implemented on a dedicated or a centralized processor to determine data element values for V2X messaging which may be sent utilizing wireless transceiver(s) 1430 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 1430 and antenna(s) 1432.

In an embodiment, vehicle capabilities in block 1306 may include performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) in block 1308, over a wireless network from vehicular data servers on the network. This is particularly helpful to obtain information for vehicles that are not wireless capable and cannot provide vehicular information directly. In an embodiment, vehicle capabilities in block 1306 may also be influenced by car component status such as tire wear, tire brand capabilities, brake pad wear, brake brand and capabilities, and engine status. In an embodiment, vehicle capabilities in block 1306 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors in block 1302 and/or vehicle internal sensors in block 1304, may be weighted more heavily and/or given preference in determining capability.

V2X vehicle sensing, prediction, planning execution 1312 handles the receipt and processing of information from blocks 1302, 1304, 1306, 1308 and 1310, via external object sensing and classification block 1314, in part utilizing sensor fusion and object classification block 1316 to correlate, corroborate and/or combine data from blocks 1302, 1304, 1306, 1308 and 1310. Block 1314 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 1314 may utilize GNSS measurement messages from other vehicles to determine the relative positioning to other vehicles. This output from block 1314 may be provided to prediction and planning block 1318, which determines detected objects and vehicles and their associated trajectory via block 1320 and determines vehicle maneuver and path planning in block 1322, the outputs of which are utilized in block 1326 vehicle maneuver execution either directly or via V2X inter-vehicle maneuver coordination block 1324, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 14 includes a functional block diagram of a vehicle 1400, according to an embodiment. The vehicle 1400 may include for example, a car, bus, truck, motorcycle and/or other motorized vehicle that may, at least in part, be driven autonomously. Vehicle 1400 may be an example of a legacy vehicle and/or of a V2X capable vehicle. As a legacy vehicle, the vehicle 1400 may lack the ability to communicate via a V2X network and/or may lack a suitable combination of vehicle sensor(s) 1445, vehicle motion sensor(s) 1440, LIDAR 1450, RADAR 1453, GNSS receiver 1470, camera(s) 1435, or ADAS capabilities that may be considered a minimum requirement for participation in a V2X network.

As shown in FIG. 14, vehicle 1400 may include a variety of software and hardware components connected via bus 1401. For example, the vehicle 1400 may include one or more processor(s) 1410 and memory 1460. Memory 1460 may include executable instructions, executable by the processor(s) 1410, to perform autonomous driving activities including, but not limited to, external object sensing and classification, prediction and planning, maneuver execution, receiving and/or transmitting V2X messages (including in some instances some combination of vehicle capabilities and/or occupant metadata). In some embodiments, memory 1460 may include vehicle processing module 1465. Vehicle processing module 1465 may correspond to code that, when executed by the processor(s) 1410, cause the processor(s) 1410 to generate and/or present (e.g., via input/output device(s) 1468 or output device(s) 1415 of FIG. 14) any suitable driver assistance information based at least in part on data elements received in one or more V2X data messages. Vehicle processing module 1465 may include code that, when executed by the processor(s) 1410, cause the processor(s) 1410 to perform any suitable operation for obtaining, soliciting, storing, receiving, transmitting, comparing, or otherwise interaction with any suitable vehicle capabilities and/or occupant metadata. The vehicle processing module 1465 may provide any suitable graphical and/or audible interface with which any suitable combination of vehicle capabilities and/or occupant metadata maybe obtained. In general, any functionality described as being provided by a V2X capable vehicle may be performed by executing code of the vehicle processing module 1465.

Vehicle 1400 may include one or more wireless transceivers, such as wireless transceiver(s) 1430, for transmitting and receiving data via various means, protocols and standards, such as via SAE or European Telecommunications Standards Institute (ETSI) CV2X messages and data elements or other wireless and wireless protocols. In some embodiments, the wireless transceiver(s) 1430 may be configured to transmit and receive data messages and elements via a short-range wireless communications protocol (e.g., Bluetooth®, Bluetooth Low Energy®, etc.), and/or via a local and/or wide area network, and/or via a cellular network, and/or via any suitable wireless network. Of course, it should be understood that these are merely examples of networks that may be utilized by the vehicle 1400 over a wireless link, and claimed subject matter is not limited in this respect. In an embodiment, wireless transceiver(s) 1430 may include various combinations of WAN, WLAN, and/or PAN transceivers. In an embodiment, wireless transceiver(s) 1430 may also include a Bluetooth transceiver, a ZigBee transceiver, or other PAN transceiver.

In some embodiments, the vehicle 1400 may include a GNSS receiver 1470. The GNSS receiver 1470 may be configured to receive and digitally process signals from a navigation satellite (and/or other vehicles) in order to provide position, velocity, and time of the receiver. The GNSS receiver 1470 may include hardware and/or software components. In an embodiment, GNSS signals from GNSS Satellites received by the GNSS receiver 1470 are utilized by vehicle 1400 for location determination and/or for the determination of GNSS signal parameters and demodulated data. In an embodiment, signals received by wireless transceiver(s) 1430 are used for location determination, alone or in combination with GNSS signals received by the GNSS receiver 1470.

Examples of network technologies that may support wireless transceiver(s) 1430 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceiver(s) 1430 may communicate with communications networks via WAN wireless base stations which may include deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may include a WLAN and/or PAN transceiver.

In an embodiment, vehicle 1400 may contain one or more camera(s) 1435. In an embodiment, the camera(s) 1435 may include a camera sensor and mounting assembly. Different mounting assemblies may be used for different cameras on vehicle 1400. For example, front facing cameras may be mounted in the front bumper, in the stem of the rear-view mirror assembly or in other front facing areas of the vehicle 1400. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

In some embodiments, at least some of camera(s) 1435 may be inward facing. The camera(s) 1435 may be utilized to capture one or more images from which vehicle data may be derived (e.g., an image of the speedometer from which speed can be derived, an image of a heading indicator from which a heading may be derived, etc.). In some embodiments, camera(s) 1435 may be utilized to capture one or more images of at least some portion of one or more of the vehicle occupants.

Vehicle motion sensor(s) 1440 may include any suitable number of accelerometers, gyros, and/or magnetometers. In some embodiments, the vehicle motion sensor(s) 1440 may be part of an inertial measurement unit of the vehicle 1400. The vehicle motion sensor(s) 1440 may be utilized to provide and/or verify motion and directional information, to monitor wheel and drive train performance, and/or to measure amplitude and frequency of oscillations of the vehicle 1400 and/or parts of the vehicle 1400. By way of example, an accelerometer (e.g., a 3-axis accelerometer) can measure vibrations of the vehicle 1400 such as movement or mechanical oscillation about an equilibrium position of a component of the vehicle 1400. Accelerometers, in an embodiment, may also be utilized to verify actual time of impact with road hazards such as pot holes relative to predicted times based on existing stopping and acceleration models as well as steering models. Gyros and magnetometers of the vehicle sensor(s) 1445 may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors such as speed sensors, wheel tick sensors, and/or odometer measurements. In some embodiments, vehicle sensor(s) 745 may be configured to measure oscillations and/or oscillation frequency corresponding to motions performed by the vehicle 1400.

The vehicle 1400 may include LIDAR 1450. LIDAR 1450 may use pulsed laser light to measure ranges to objects. While camera(s) 1435 can provide object detection, LIDAR 1450 may provide a means to detect the distances (and orientations) of the objects with more certainty, especially in regard to objects of unknown size and shape. LIDAR 1450 measurements may also be used to estimate rate of travel, vector directions, relative position and stopping distance by providing accurate distance measurements and delta distance measurements.

In an embodiment, power and drive systems and related systems 1475 (generator, battery, transmission, engine) and systems 1455 (brake, actuator, throttle control, steering, and electrical) may be controlled by the processor(s) 1410 and/or hardware or software or by an operator of the vehicle or by some combination thereof. The systems 1455 and power and drive systems and related systems 1475 may be utilized in conjunction with performance parameters and operational parameters, to enable autonomously (and manually, relative to alerts and emergency overrides/braking/stopping) driving and operating a vehicle 1400 safely and accurately, such as to safely, effectively and efficiently merge into traffic, stop, accelerate and otherwise operate the vehicle 1400. In an embodiment, input from the various sensor systems such as camera(s) 1435, vehicle motion sensor(s) 1440 (including accelerometers, gyros, manometers, etc.), LIDAR 1450, GNSS receiver 1470, RADAR 1453, input, messaging and/or measurements from wireless transceiver(s) 1430 or various combinations thereof, may be utilized by processor(s) 1410 and/or DSP 1420 or other processing systems to control power and drive systems and related systems 1475 and systems 1455.

GNSS receiver 1470 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 1470, may receive RF signals from one or more GNSS satellites using one or more antenna(s) 1472. The GNSS receiver 1470 may support one or more GNSS constellations as well as other satellite-based navigation systems. For example, in an embodiment, GNSS receiver 1470 may support global navigation satellite systems such as GPS, the GLONASS, Galileo, and/or BeiDou, or any combination thereof. In an embodiment, GNSS receiver 1470 may support regional navigation satellite systems such as NavIC or QZSS or a combination thereof as well as various augmentation systems (e.g., Satellite Based Augmentation Systems (SBAS) or ground based augmentation systems (GBAS)) such as Doppler orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver 1470 and antenna(s) 1472 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 1470 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudo-range measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from road-side units (RSUs), to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an road-side unit (RSU) equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1453, uses transmitted radio waves that are reflected off of objects. The reflected radio waves are analyzed, based on the time taken for reflections to arrive and other signal characteristics of the reflected waves to determine the location of nearby objects. RADAR 1453 may be utilized to detect the location of nearby cars, roadside objects (signs, other vehicles, pedestrians, etc.) and will generally enable detection of objects even if there is obscuring weather such as snow, rail or hail. Thus, RADAR 1453 may be used to complement LIDAR 1450 and camera(s) 1435 in providing ranging information to other objects by providing ranging and distance measurements and information when visual-based systems typically fail. Furthermore, RADAR 1453 may be utilized to calibrate and/or sanity check other systems such as LIDAR 1450 and camera(s) 1435. Ranging measurements from RADAR 1453 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

Input/output device(s) 1468 may include any suitable one or more audio devices (e.g., one or more speakers) and/or one or more display(s) (e.g., a dashboard display, a media display, a projected display, and the like). The input/output device(s) 1468 may provide an interface through which a mobile device (e.g., mobile device 1202 of FIG. 12) can provide data for presentation at vehicle 1400 (e.g., in scenarios in which mobile device 1202 is acting as proxy for the vehicle 1400.

Figure 15:
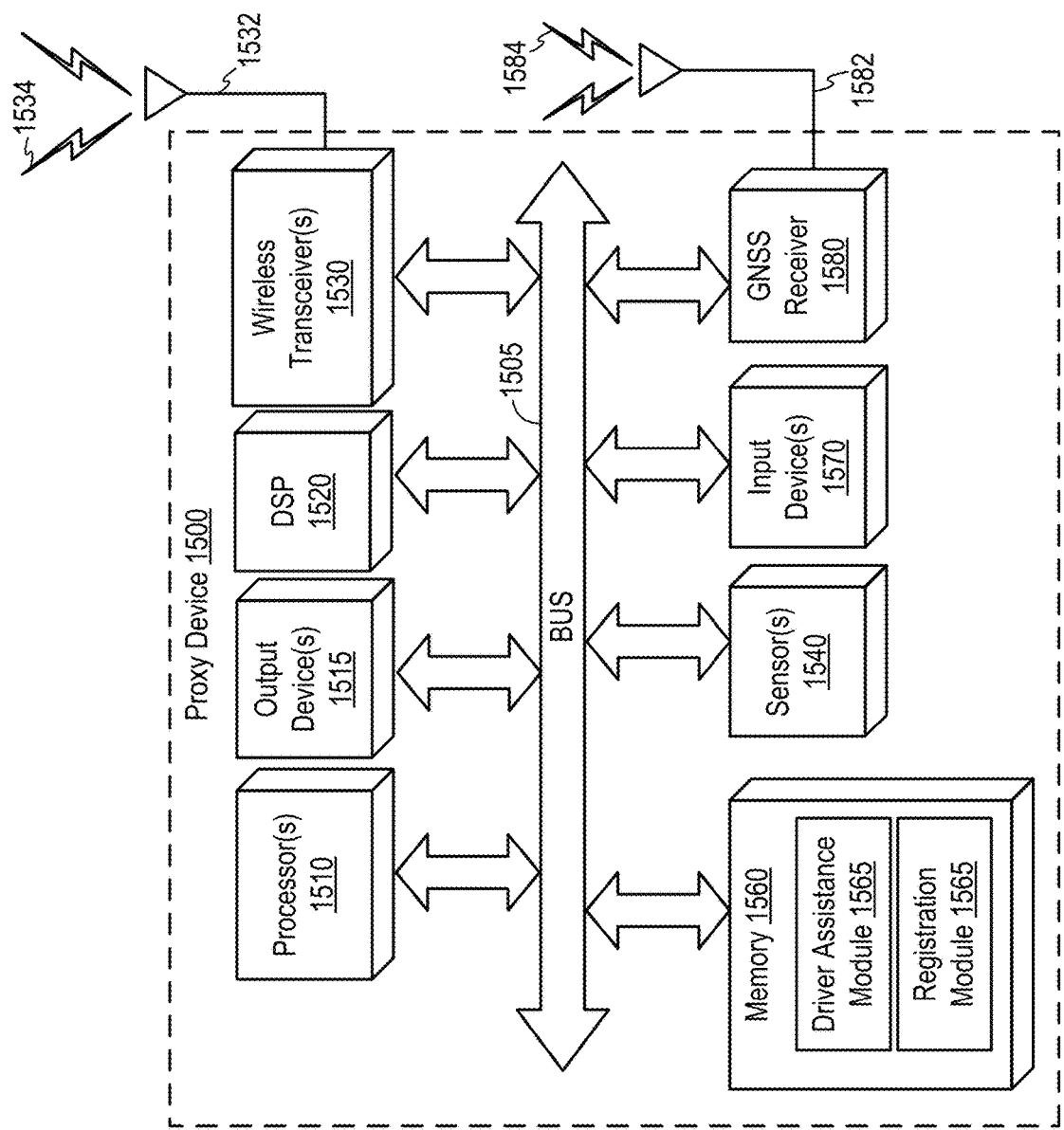
FIG. 15 illustrates a functional block diagram of an example of a proxy device (e.g., a mobile device) according to certain embodiments.

FIG. 15 is a block diagram of an embodiment of a proxy device 1500, in accordance with at least one embodiment. According to some embodiments, the proxy device 1500 may include a stand-alone device mobile device (e.g. a smartphone, a laptop, a tablet PC, a broadband device, customer premises equipment such as routers, gateways or other fixed mobile convergence devices, etc.), which may be communicatively coupled with other components/devices of the vehicle or RSU. It also can be noted that the proxy device 1500 may be utilized in the similar manner by V2X entities other than a vehicle or RSU. Additionally, embodiments may not necessarily be limited to V2X communications. As such, alternative embodiments may include a device similar to the proxy device 1500, having similar components to those shown in FIG. 15 and capable of performing the functions of the vehicles and/or RSU described in the previously-discussed embodiments, but without V2X functionality.

It should also be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices, which may be located, for example, at different physical locations on a vehicle, RSU, or other V2X entity.

The proxy device 1500 is shown comprising hardware elements that can be electrically coupled via a bus 1505 (or may otherwise be in communication, as appropriate). The hardware elements may include a processor(s) 1510 which can include without limitation one or more general-purpose processors, one or more special-purpose processors (such as digital signal processing (DSP) chips (e.g., DSP 1520), graphics acceleration processors, application-specific integrated circuits (ASICs), and/or the like), and/or other processing structure or means.

The proxy device 1500 also can include one or more input device(s) 1570, which can include devices related to user interface (e.g., a touch screen, touchpad, microphone, button(s), dial(s), switch(es), and/or the like). Similarly, the one or more output device(s) 1515 may be related to interacting with a user (e.g., via a display, light emitting diode(s) (LED(s)), speaker(s), etc.). For example, the one or more output device(s) 1515 may be utilized by the proxy device 1500 to display driver assistance information 122 of FIG. 1.

The proxy device 1500 may also include a wireless communication interface 1530, which may include without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. The wireless communication interface 1530 can enable the proxy device 1500 to communicate to other V2X devices (e.g., vehicle B 590, RSU(s) 525, servers 540, 545, 550, 555, 560, and 565 of FIG. 5) and devices that lack V2X communication capabilities (e.g., vehicle A 580). This can include the various forms of communication of the previously-described embodiments. And as such, it may be capable of transmitting direct communications, broadcasting wireless signals, receiving direct and/or broadcast wireless signals, and so forth. Accordingly, the wireless communication interface 1530 may be capable of sending and/or receiving RF signals from various RF channels/frequency bands. Communication using the wireless communication interface 1530 can be carried out via one or more wireless communication antenna(s) 1532 that send and/or receive wireless signals 1534.

The proxy device 1500 can further include sensor(s) 1540. Sensor(s) 1540 may include, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensor(s) 1540 may be used, for example, to determine certain real-time characteristics of the vehicle, such as location, velocity, acceleration, and the like. As previously indicated, sensor(s) 1540 may be used to help a vehicle determine its location.

Embodiments of the proxy device 1500 may also include a GNSS receiver 1580 capable of receiving signals 1584 from one or more GNSS satellites using an antenna 1582 (which, in some embodiments, may be the same as wireless communication antenna(s) 1532). Positioning based on GNSS signal measurement can be utilized to determine a current location of the proxy device 1500, and may further be used as a basis to determine the location of a detected object. The GNSS receiver 1580 can extract a position of the proxy device 1500, using conventional techniques, from GNSS satellites of a GNSS system, such as Global Positioning System (GPS) and/or similar satellite systems.

The proxy device 1500 may further include and/or be in communication with a memory 1560. The memory 1560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of the proxy device 1500 also can include software elements (some of which are not shown in FIG. 15) including an operating system, device drivers, executable libraries, and/or other code, such as one or more application programs, which may include computer programs provided by various embodiments, and/or may be designed to implement methods and/or configure systems as described herein. Software applications (e.g., the driver assistance module 1565) stored in memory 1560 and executed by processor(s) 1510 may be used to implement the functionality providing the functionality of proxy devices as described herein. Moreover, one or more procedures described with respect to the method(s) discussed herein may be implemented as part of the driver assistance module 1565 and stored in memory 1560. The code/instructions of driver assistance module 1565 are executable by the proxy device 1500 (and/or processor(s) 1510 or DSP 1520 within proxy device 1500) and may include the functions illustrated in the methods of FIGS. 2-4 described above. In an aspect, then, such code and/or instructions can be used to configure and/or adapt a general-purpose computer (or other device) to perform one or more operations in accordance with the described methods.

In some embodiments, memory 1560 may include registration module 1575. Registration module 1575 may include code that, when executed by the processor(s) 1510, cause the processor(s) 1510 to perform any suitable operation for obtaining, soliciting, storing, receiving, transmitting, comparing, or otherwise interaction with any suitable vehicle metadata and/or occupant metadata. The registration module 1575 may provide any suitable graphical and/or audible interface with which any suitable combination of vehicle metadata and/or occupant metadata maybe obtained (e.g., from a user of the proxy device 1500). The registration module 1575 may include one or more application programming interface with which occupant metadata may be obtained and/or provided by one or more user devices associated with one or more occupants of the vehicle.

Processor(s) 1510 may receive location, vehicle metadata and/or occupant metadata of vehicle A 580, status, GNSS and other sensor measurements, and capability information from vehicle A 580 and/or vehicle B 590 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging (e.g., from RSU(s) 525, vehicle A 580, vehicle B 590, or any suitable combination of the servers of FIG. 5). Processor(s) 1510 may utilize the received information to coordinate and direct traffic flow and to provide environmental, vehicular, safety and announcement messages to vehicle A 580, which would otherwise not be able to ascertain such information. By utilizing the proxy device 1500, a legacy vehicle can participate in a V2X environment such that information provided by other V2X entities can be presented to the driver of the legacy vehicle.

Processor 525A may be configured to operate a network interface 525B, in an embodiment, which may be connected via a backhaul to network 570, and which may be used, in an embodiment, to communicate and coordinate with various centralized servers such as a centralized traffic control and optimization server 565 that monitors and optimizes the flow of traffic in an area such as within a city or a section of a city or in a region. Network interface 525B may also be utilized for remote access to RSU(s) 525 for crowd sourcing of vehicle data, maintenance of the RSU(s) 525, and/or coordination with other RSU(s) 525 or other uses. RSU(s) 525 may have a processor 525A configured to operate traffic control unit 525C which may be configured to process data received from vehicles such as vehicle A 580 and vehicle B 590 such as location data, stopping distance data, road condition data, identification data and other information related to the status and location of nearby vehicles and environment. RSU(s) 525 may have a processor 525A configured to obtain data from environmental and roadside sensors 525D, which may include temperature, weather, camera, pressure sensors, road sensors (for car detection, for example), accident detection, movement detection, speed detection and other vehicle and environmental monitoring sensors.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, BC, AC, AA, BB, CC, AAB, ABC, AABBCCC, or the like.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method comprising, by a mobile device: receiving a Global Navigation Satellite System (GNSS) signal; receiving, from a wireless device, via a PC5 interface, a message including a location of a reference structure, a calculated location of the mobile device, or a combination thereof; and determining whether the GNSS signal is a spoofing signal based on: a spoof indication of the GNSS signal; and whether a difference between a location of the mobile device determined based on the GNSS signal and one of the location of the reference structure, the calculated location of the mobile device, or a location of the mobile device determined based on the location of the reference structure is greater than a threshold value.

Clause 2. The method of clause 1, wherein the wireless device comprises a roadside unit (RSU).

Clause 3. The method of clause 1 or 2, wherein the message comprises a Cellular Vehicle-to-everything (CV2X) message.

Clause 4. The method of any of clauses 1-3, wherein the spoof indication of the GNSS signal comprises: a change of a GNSS time derived from the GNSS signal over a previously determined GNSS time greater than a first threshold value; a change of the location of the mobile device determined based on the GNSS signal over a previously determined location of the mobile device greater than a second threshold value; a difference between the GNSS time and a local time of the mobile device greater than a third threshold value; a difference between the location of the mobile device determined based on the GNSS signal and a location of the mobile device determined based on sensor data of the mobile device other than the GNSS signal greater than a fourth threshold value; a signal strength of the GNSS signal greater than a fifth threshold value; a difference between the signal strength of the GNSS signal and a signal strength of a previous GNSS signal that is associated with a same satellite as the GNSS signal greater than a sixth threshold value; a difference between a frequency of the GNSS signal and a frequency of the previous GNSS signal greater than a seven threshold value; or a combination thereof.

Clause 5. The method of clause 4, wherein the sensor data of the mobile device includes sensor data of a Radio Detection And Ranging (RADAR) sensor, a camera, a Light Detection And Ranging (LIDAR) sensor, a motion sensor, a wheel sensor, an ultrasonic sensor, or a combination thereof.

Clause 6. The method of clause 4 or 5, further comprising, upon determining that the GNSS signal is a spoofing signal, determining the location of the mobile device based on the sensor data of the mobile device other than the GNSS signal.

Clause 7. The method of any of clauses 1-6, further comprising sending a request to the wireless device for reference location information.

Clause 8. The method of clause 7, wherein the request is included in a CV2X Basic Safety Message (BSM) that includes location information of the mobile device.

Clause 9. The method of clause 8, wherein the calculated location of the mobile device is determined by the wireless device based on the location information of the mobile device included in the CV2X BSM, a signal strength of the CV2X BSM, an output of a sensor associated with the wireless device, or a combination thereof.

Clause 10. The method of any of clauses 1-9, further comprising receiving, from the wireless device, a confidence level of the calculated location of the mobile device or a confidence level of the location of the mobile device determined based on the GNSS signal.

Clause 11. The method of any of clauses 1-10, further comprising receiving, from the wireless device, an indication that a difference between the location of the mobile device determined based on the GNSS signal and the calculated location of the mobile device is greater than the threshold value.

Clause 12. The method of any of clauses 1-11, wherein the message includes a CV2X road safety message (RSM), a CV2X Traveler Information Message (TIM), or a CV2X Signal Phase and Time (SPAT) message.

Clause 13. The method of any of clauses 1-12, wherein the reference structure includes an RSU, a bridge, a landmark, a building, or a roadside marker.

Clause 14. A mobile device comprising: a transceiver including a PC5 interface; a Global Navigation Satellite System (GNSS) receiver; a memory; and one or more processors communicatively coupled with the transceiver, the GNSS receiver, and the memory and configured to: receive, via the GNSS receiver, a GNSS signal; receive, via the PC5 interface, from a wireless device, a message including a location of a reference structure, a calculated location of the mobile device, or a combination thereof; and determine whether the GNSS signal is a spoofing signal based on: a spoof indication of the GNSS signal; and whether a difference between a location of the mobile device determined based on the GNSS signal and one of the location of the reference structure, the calculated location of the mobile device, or a location of the mobile device determined based on the location of the reference structure is greater than a threshold value.

Clause 15. The mobile device of clause 14, wherein the wireless device includes a roadside unit (RSU).

Clause 16. The mobile device of clause 14 or 15, wherein the message includes a Cellular Vehicle-to-everything (CV2X) message.

Clause 17. The mobile device of any of clauses 14-16, wherein the spoof indication comprises: a change of a GNSS time derived from the GNSS signal over a previously determined GNSS time greater than a first threshold value; a change of the location of the mobile device determined based on the GNSS signal over a previously determined location of the mobile device greater than a second threshold value; a difference between the GNSS time and a local time of the mobile device greater than a third threshold value; a difference between the location of the mobile device determined based on the GNSS signal and a location of the mobile device determined based on sensor data other than the GNSS signal greater than a fourth threshold value; a signal strength of the GNSS signal greater than a fifth threshold value; a difference between the signal strength of the GNSS signal and a signal strength of a previous GNSS signal that is associated with a same satellite as the GNSS signal greater than a sixth threshold value; a difference between a frequency of the GNSS signal and a frequency of the previous GNSS signal greater than a seven threshold value; or a combination thereof.

Clause 18. The mobile device of clause 17, wherein the sensor data includes sensor data of a Radio Detection And Ranging (RADAR) sensor, a camera, a Light Detection And Ranging (LIDAR) sensor, a motion sensor, a wheel sensor, an ultrasonic sensor, or a combination thereof.

Clause 19. The mobile device of clause 17 or 18, wherein the one or more processors are further configured to determine the location of the mobile device based on the sensor data other than the GNSS signal.

Clause 20. The mobile device of any of clauses 14-19, wherein the one or more processors are further configured to send, via the PC5 interface, a request to the wireless device for reference location information, the request included in a CV2X Basic Safety Message (BSM) that includes location information of the mobile device.

Clause 21. The mobile device of clause 20, wherein the calculated location of the mobile device is determined by the wireless device based on the location information of the mobile device included in the CV2X BSM, a signal strength of the CV2X BSM, an output of a sensor associated with the wireless device, or a combination thereof.

Clause 22. The mobile device of any of clauses 14-21, wherein the message includes a CV2X road safety message (RSM), a CV2X Traveler Information Message (TIM), or a CV2X Signal Phase and Time (SPAT) message.

Clause 23. A mobile device comprising: means for receiving a Global Navigation Satellite System (GNSS) signal; means for receiving, from a wireless device, via a PC5 interface, a message including a location of a reference structure, a calculated location of the mobile device, or a combination thereof; and means for determining whether the GNSS signal is a spoofing signal based on: a spoof indication of the GNSS signal; and whether a difference between a location of the mobile device determined based on the GNSS signal and one of the location of the reference structure, the calculated location of the mobile device, or a location of the mobile device determined based on the location of the reference structure is greater than a threshold value.

Clause 24. The mobile device of clause 21, wherein the spoof indication comprises: a change of a GNSS time derived from the GNSS signal over a previously determined GNSS time greater than a first threshold value; a change of the location of the mobile device determined based on the GNSS signal over a previously determined location of the mobile device greater than a second threshold value; a difference between the GNSS time and a local time of the mobile device greater than a third threshold value; a difference between the location of the mobile device determined based on the GNSS signal and a location of the mobile device determined based on sensor data other than the GNSS signal greater than a fourth threshold value; a signal strength of the GNSS signal greater than a fifth threshold value; a difference between the signal strength of the GNSS signal and a signal strength of a previous GNSS signal that is associated with a same satellite as the GNSS signal greater than a sixth threshold value; a difference between a frequency of the GNSS signal and a frequency of the previous GNSS signal greater than a seven threshold value; or a combination thereof.

Clause 25. The mobile device of clause 23 or 24, wherein: the wireless device includes a roadside unit (RSU); and the message includes a Cellular Vehicle-to-everything (CV2X) message.

Clause 26. The mobile device of any of clauses 23-25, wherein the message includes a CV2X road safety message (RSM), a CV2X Traveler Information Message (TIM), or a CV2X Signal Phase and Time (SPAT) message.

Clause 27. A non-transitory computer-readable medium having instructions embedded thereon which, when executed by one or more processing units, cause the one or more processing units to perform operations including: receiving, via a Global Navigation Satellite System (GNSS) receiver of a mobile device, a GNSS signal; receiving, from a wireless device, via a PC5 transceiver, a message including a location of a reference structure, a calculated location of the mobile device, or a combination thereof; and determining whether the GNSS signal is a spoofing signal based on: a spoof indication of the GNSS signal; and whether a difference between a location of the mobile device determined based on the GNSS signal and one of the location of the reference structure, the calculated location of the mobile device, or a location of the mobile device determined based on the location of the reference structure is greater than a threshold value.

Clause 28. The non-transitory computer-readable medium of clause 27, wherein the spoof indication comprises: a change of a GNSS time derived from the GNSS signal over a previously determined GNSS time greater than a first threshold value; a change of the location of the mobile device determined based on the GNSS signal over a previously determined location of the mobile device greater than a second threshold value; a difference between the GNSS time and a local time of the mobile device greater than a third threshold value; a difference between the location of the mobile device determined based on the GNSS signal and a location of the mobile device determined based on sensor data other than the GNSS signal greater than a fourth threshold value; a signal strength of the GNSS signal greater than a fifth threshold value; a difference between the signal strength of the GNSS signal and a signal strength of a previous GNSS signal that is associated with a same satellite as the GNSS signal greater than a sixth threshold value; a difference between a frequency of the GNSS signal and a frequency of the previous GNSS signal greater than a seven threshold value; or a combination thereof.

Clause 29. The non-transitory computer-readable medium of clause 27 or 28, wherein: the wireless device includes a roadside unit (RSU); and the message includes a Cellular Vehicle-to-everything (CV2X) message.

Clause 30. The non-transitory computer-readable medium of any of clauses 27-29, wherein the message includes a CV2X road safety message (RSM), a CV2X Traveler Information Message (TIM), or a CV2X Signal Phase and Time (SPAT) message.

What is claimed is:

1. A method comprising, by a mobile device:
   receiving a Global Navigation Satellite System (GNSS) signal;
   receiving, from a wireless device, via a PC5 interface, a message including a location of a non-transmitting reference structure;
   determining, via one or more Radio Detection And Ranging (RADAR) sensors, one or more LIght Detection And Ranging (LIDAR) sensors, one or more cameras, or any combination thereof, a location of the mobile device with respect to the reference structure, wherein the location of the mobile device is different from the location of the reference structure; and
   determining whether the GNSS signal is a spoofing signal based on a difference between the location of the mobile device with respect to the reference structure and a location of the mobile device determined based on the GNSS signal.

2. The method of claim 1, wherein determining whether the GNSS signal is a spoofing signal includes determining whether the difference is greater than a threshold value.

3. The method of claim 1, wherein the wireless device comprises a roadside unit (RSU).

4. The method of claim 1, wherein the message comprises a Cellular Vehicle-to-everything (CV2X) message.

5. The method of claim 1, further comprising, prior to or after determining whether the GNSS signal is a spoofing signal, determining whether:
   a change of a GNSS time derived from the GNSS signal over a previously determined GNSS time is greater than a first threshold value;
   a change of the location of the mobile device determined based on the GNSS signal over a previously determined location of the mobile device is greater than a second threshold value;
   a difference between the GNSS time and a local time of the mobile device is greater than a third threshold value;
   a difference between the location of the mobile device determined based on the GNSS signal and a location of the mobile device determined based on sensor data of the mobile device other than the GNSS signal is greater than a fourth threshold value;
   a signal strength of the GNSS signal is greater than a fifth threshold value;
   a difference between the signal strength of the GNSS signal and a signal strength of a previous GNSS signal that is associated with a same satellite as the GNSS signal is greater than a sixth threshold value;
   a difference between a frequency of the GNSS signal and a frequency of the previous GNSS signal is greater than a seven threshold value; or
   a combination thereof.

6. The method of claim 1, further comprising, upon determining that the GNSS signal is a spoofing signal, determining the location of the mobile device based on sensor data of the mobile device other than the GNSS signal.

7. The method of claim 6, wherein the sensor data of the mobile device includes sensor data of a motion sensor, a wheel sensor, an ultrasonic sensor, or a combination thereof.

8. The method of claim 1, further comprising sending a request to the wireless device for reference location information.

9. The method of claim 8, wherein the request is included in a CV2X Basic Safety Message (BSM).

10. The method of claim 1, wherein the message includes a CV2X road safety message (RSM), a CV2X Traveler Information Message (TIM), or a CV2X Signal Phase and Time (SPAT) message.

11. The method of claim 1, wherein the reference structure includes a bridge, a landmark, a building, or a roadside marker.

12. A mobile device comprising:
   a transceiver including a PC5 interface;
   a Global Navigation Satellite System (GNSS) receiver;
   a memory; and
   one or more processors communicatively coupled with the transceiver, the GNSS receiver, and the memory and configured to:
      receive, via the GNSS receiver, a GNSS signal;
      receive, via the PC5 interface, from a wireless device, a message including a location of a non-transmitting reference structure;
      determine, via one or more Radio Detection And Ranging (RADAR) sensors, one or more Light Detection And Ranging (LIDAR) sensors, one or more cameras, or any combination thereof, a location of the mobile device with respect to the reference structure, wherein the location of the mobile device is different from the location of the reference structure; and
      determine whether the GNSS signal is a spoofing signal based on a difference between the location of the mobile device with respect to the reference structure and a location of the mobile device determined based on the GNSS signal.

13. The mobile device claim 12, wherein the one or more processors are configured to determine whether the GNSS signal is a spoofing signal based on whether the difference is greater than a threshold value.

14. The mobile device claim 12, wherein:
   the wireless device includes a roadside unit (RSU); and
   the message includes a Cellular Vehicle-to-everything (CV2X) message.

15. The mobile device of claim 12, wherein the one or more processors are configured to determine, prior to or after determining whether the GNSS signal is a spoofing signal, determining whether:
   a change of a GNSS time derived from the GNSS signal over a previously determined GNSS time is greater than a first threshold value;
   a change of the location of the mobile device determined based on the GNSS signal over a previously determined location of the mobile device is greater than a second threshold value;
   a difference between the GNSS time and a local time of the mobile device is greater than a third threshold value;
   a difference between the location of the mobile device determined based on the GNSS signal and a location of the mobile device determined based on sensor data other than the GNSS signal is greater than a fourth threshold value;
   a signal strength of the GNSS signal is greater than a fifth threshold value;
   a difference between the signal strength of the GNSS signal and a signal strength of a previous GNSS signal that is associated with a same satellite as the GNSS signal is greater than a sixth threshold value;
   a difference between a frequency of the GNSS signal and a frequency of the previous GNSS signal greater than a seven threshold value; or
   a combination thereof.

16. The mobile device of claim 12, wherein the one or more processors are further configured to determine, upon determining that the GNSS signal is a spoofing signal, the location of the mobile device based on sensor data other than the GNSS signal.

17. The mobile device of claim 16, wherein the sensor data includes sensor data of a motion sensor, a wheel sensor, an ultrasonic sensor, or a combination thereof.

18. The mobile device of claim 12, wherein the one or more processors are further configured to send, via the PC5 interface, a request to the wireless device for reference location information, the request included in a CV2X Basic Safety Message (BSM).

19. The mobile device of claim 12, wherein the message includes a CV2X road safety message (RSM), a CV2X Traveler Information Message (TIM), or a CV2X Signal Phase and Time (SPAT) message.

20. The mobile device of claim 12, wherein the reference structure includes a bridge, a landmark, a building, or a roadside marker.

21. A mobile device comprising:
   means for receiving a Global Navigation Satellite System (GNSS) signal;
   means for receiving, from a wireless device, via a PC5 interface, a message including a location of a non-transmitting reference structure;
   means for determining, via a means for receiving Radio Detection And Ranging (Radar) sensor measurements, means for receiving Light Detection and Ranging (LIDAR) sensor measurements, means for receiving camera data, or any combination thereof, a location of the mobile device with respect to the reference structure, wherein the location of the mobile device is different from the location of the reference structure; and
   means for determining whether the GNSS signal is a spoofing signal based on a difference between the location of the mobile device with respect to the reference structure and a location of the mobile device determined based on the GNSS signal.

22. The mobile device of claim 21, wherein:
   the wireless device includes a roadside unit (RSU); and
   the message includes a Cellular Vehicle-to-everything (CV2X) message.

23. The mobile device of claim 21, wherein the message includes a CV2X road safety message (RSM), a CV2X Traveler Information Message (TIM), or a CV2X Signal Phase and Time (SPAT) message.

24. The mobile device of claim 21, wherein the reference structure includes an RSU, a bridge, a landmark, a building, or a roadside marker.

25. The mobile device of claim 21, further comprising means for sending, via the PC5 interface, a request for reference location information to the wireless device, the request included in a CV2X Basic Safety Message (BSM).

26. The mobile device of claim 21, further comprising means for determining, upon determining that the GNSS signal is a spoofing signal, the location of the mobile device based on sensor data of the mobile device other than the GNSS signal.

27. The mobile device of claim 26, wherein the sensor data includes sensor data of a motion sensor, a wheel sensor, an ultrasonic sensor, or a combination thereof.

28. A non-transitory computer-readable medium having instructions embedded thereon which, when executed by one or more processing units, cause the one or more processing units to perform operations including:
- receiving, via a Global Navigation Satellite System (GNSS) receiver of a mobile device, a GNSS signal;
- receiving, from a wireless device, via a PC5 transceiver, a message including a location of a non-transmitting reference structure;
- determining, via one or more Radio Detection And Ranging (RADAR) sensors, one or more LIght Detection And Ranging (LIDAR) sensors, one or more cameras, or any combination thereof, a location of the mobile device with respect to the reference structure, wherein the location of the mobile device is different from the location of the reference structure; and
- determining whether the GNSS signal is a spoofing signal based on a difference between the location of the mobile device with respect to the reference structure and a location of the mobile device determined based on the GNSS signal.

29. The non-transitory computer-readable medium of claim 28, wherein:
- the wireless device includes a roadside unit (RSU); and
- the message includes a Cellular Vehicle-to-everything (CV2X) message.

30. The non-transitory computer-readable medium of claim 28, wherein the operations further comprises sending, via the PC5 interface, a request for reference location information to the wireless device, the request included in a CV2X Basic Safety Message (BSM).

* * * * *